United States Patent
Hirai

(10) Patent No.: US 7,399,224 B2
(45) Date of Patent: *Jul. 15, 2008

(54) METHOD OF GAME CHARACTER MOVEMENT CONTROL IN GAME SPACE

(75) Inventor: Yoshiaki Hirai, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 531 days.

This patent is subject to a terminal disclaimer.

(21) Appl. No.: 10/825,311

(22) Filed: Apr. 16, 2004

(65) Prior Publication Data

US 2004/0259616 A1    Dec. 23, 2004

(30) Foreign Application Priority Data

Apr. 25, 2003    (JP) ............................ 2003-122695

(51) Int. Cl.
*A63F 13/00*    (2006.01)

(52) U.S. Cl. ............................... 463/4; 463/31; 463/43

(58) Field of Classification Search ............... 463/4, 463/30, 31, 43, 44
See application file for complete search history.

(56) References Cited

U.S. PATENT DOCUMENTS

| | | | | |
|---|---|---|---|---|
| 3,874,669 A * | 4/1975 | Ariano et al. | ............... | 463/4 |
| 5,863,248 A * | 1/1999 | Mine et al. | ............... | 463/4 |
| 6,149,520 A * | 11/2000 | Takatsuka | ............... | 463/4 |
| 6,503,144 B1 * | 1/2003 | Rimoto et al. | ............... | 463/4 |
| 6,558,258 B1 * | 5/2003 | Rupert et al. | ............... | 463/33 |

* cited by examiner

*Primary Examiner*—Ronald Laneau
*Assistant Examiner*—Victor Cheung
(74) *Attorney, Agent, or Firm*—Oliff & Berridge, PLC

(57) ABSTRACT

Provided is a game performing method for executing a given game by controlling movements of characters in a game space. The generated image of the game space has a set plurality of sample points in the game space; calculated positions of the characters; calculated arrival times of the characters; recognized areas pertaining to power of the character group; and controlled movements of the characters on positions and/or magnitudes of the recognized areas in the game space.

20 Claims, 22 Drawing Sheets

(CHARACTER M)
NPC $L = V_n \times 0.5 (\text{sec})$
$T = \overline{PQ}/V_a$

NPC
(CHARACTER C)

SPACE EVALUATION POINT= T-to

FIG.10A

733 AREA REGISTRATION TBL

| | | | | |
|---|---|---|---|---|
| 733a — AREA IDENTIFICATION INFORMATION | AR11 | AR1,Q | AR1,R | |
| 733b — REPRESENTATIVE POINT COORDINATES | (X11,Z11) | (X12,Z12) | (X13,Z13) | |
| 733c — MINIMUM ARRIVAL TIME | 3.2sec | 5.2sec | 2.2sec | |
| 733d — DOMINANT ATHLETE IDENTIFICATION INFORMATION | YOUNG PIG MAN | COMPETITOR 1 | COMPETITOR 2 | |
| 733e — DOMINANT TEAM IDENTIFICATION INFORMATION | PLAYER | COM | COM | |
| 733f — SPACE EVALUATION POINT | 1.8 | -0.2 | 2.8 | |

FIG.10B

SPACE EVALUATION POINT = POWER SPHERE JUDGING TIME (5sec) − MINIMUM ARRIVAL TIME Ts(sec)

FIG.11

| MOVEMENT SETTING INFORMATION | |
|---|---|
| KIND OF MOVEMENT | "RUNNING UP ONTO BALL SIDE" |
| CIRCUMSTANTIAL CONDITION | NO PASSES TO BLIND SIDE ARE SENT |
| ATHLETE SELECTION CONDITIONS | POSITION COORDINATES OF ATHLETE ARE BEHIND BALL |
| | POSITION COORDINATES OF ATHLETE ARE AT SIDE |
| | POSITION COORDINATES OF ATHLETE ARE WITHIN PRESCRIBED DISTANCE FROM BALL (RELATIVELY NEAR) |
| | POSITION COORDINATES OF ATHLETE ARE LARGER THAN THOSE OF BALL TO INDICATE NONEXISTENCE IN INSIDE |
| | SPACE LIES IN ATTACKING DIRECTION OF ATHLETE |
| MOVEMENT TARGET POINT SELECTION CONDITION | REPRESENTATIVE POINT Q OF AREA AR AT ALMOST CENTER OF GRAVITY OF GROUP OF AREAS WHICH LIE TOWARD ATTACKING DIRECTION FROM ATHLETE, AND IN WHICH PRESCRIBED NUMBER OF SPACES OR MORE ARE CONNECTED WITH ONE ANOTHER |
| MOVEMENT EVALUATION POINT | SPACE EVALUATION POINT/2 × WEIGHTING FACTOR |
| KIND OF MOVEMENT | "RUNNING INTO FRONT SPACE" |
| CIRCUMSTANTIAL CONDITION | BALL LIES IN MIDDLE BOARD |
| ATHLETE SELECTION CONDITIONS | BALL LIES IN CENTER, AND ATHLETE LIES IN SIDE |
| | BALL LIES IN SIDE, AND ATHLETE LIES IN CENTER |
| | SPACE LIES IN ATTACKING DIRECTION OF ATHLETE |
| MOVEMENT TARGET POINT SELECTION CONDITION | REPRESENTATIVE POINT Q OF AREA AR WHICH LIES TOWARD ATTACKING DIRECTION FROM ATHLETE, AND IN WHICH SPACE EVALUATION POINT IS MAXIMUM |
| MOVEMENT EVALUATION POINT | SPACE EVALUATION POINT/2 × WEIGHTING FACTOR |
| ⋮ | |
| KIND OF MOVEMENT | "RETURN TO FORMATION POSITION" |
| CIRCUMSTANTIAL CONDITION | ALWAYS |
| ATHLETE SELECTION CONDITIONS | ALL ATHLETES |
| MOVEMENT TARGET POINT SELECTION CONDITION | PRESCRIBED FORMATION POSITION |
| MOVEMENT EVALUATION POINT | 1 (FIXED VALUE) |

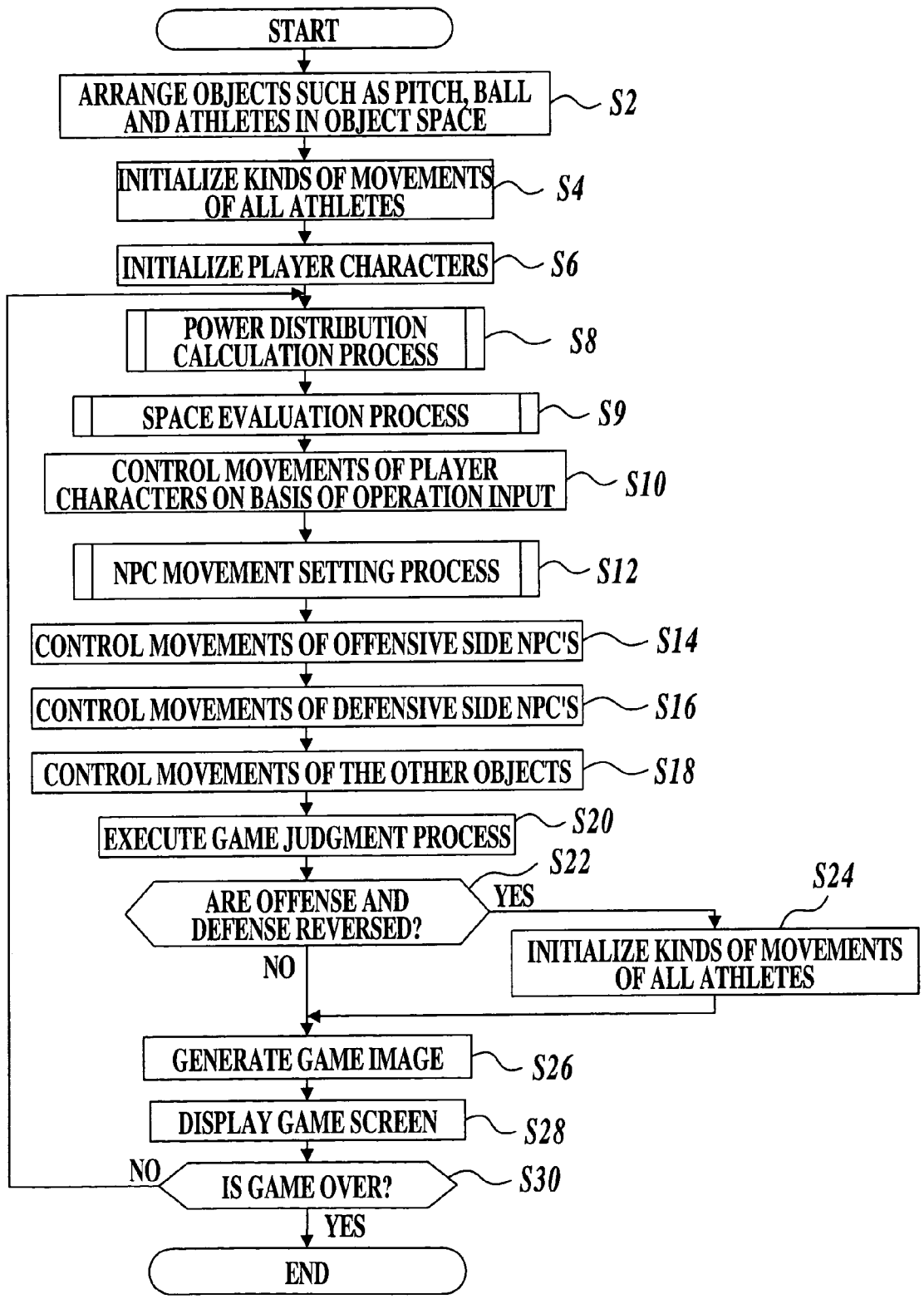

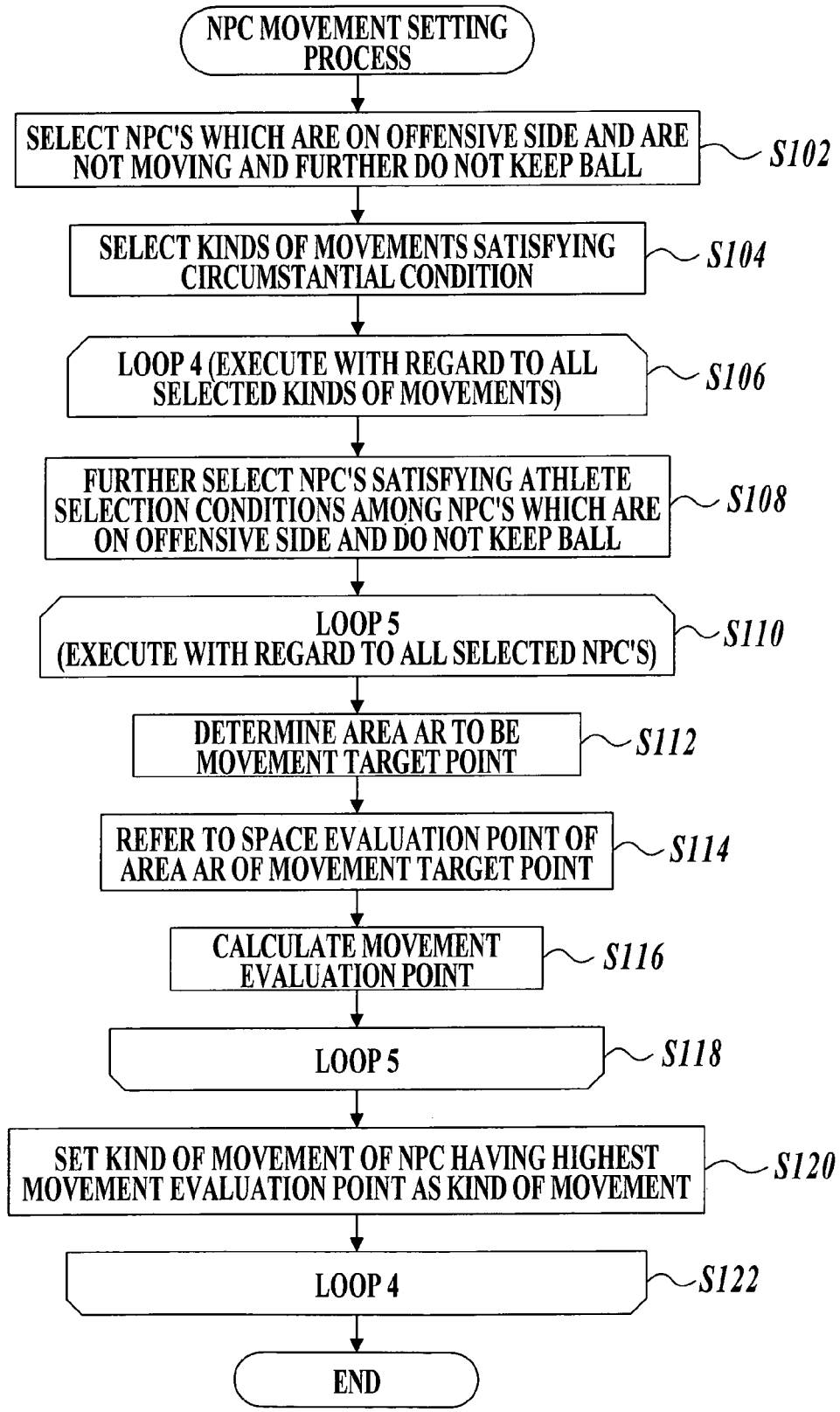

FIG.19A 735-1

AREA REGISTRATION TBL

| APPLICATION TEAM | PLAYER | | |
|---|---|---|---|
| AREA IDENTIFICATION INFORMATION | AR11 | AR1,Q | AR1,R |
| REPRESENTATIVE POINT COORDINATES | (X11,Z11) | (X12,Z12) | (X13,Z13) |
| MINIMUM ARRIVAL TIME | 3.2sec | 5.2sec | 2.2sec |
| SPACE EVALUATION POINT | -1.8 | -0.2 | -2.8 |

733a — AREA IDENTIFICATION INFORMATION
733b — REPRESENTATIVE POINT COORDINATES
735c — MINIMUM ARRIVAL TIME
735f — SPACE EVALUATION POINT

FIG.19B 735-2

AREA REGISTRATION TBL

| APPLICATION TEAM | COM | | |
|---|---|---|---|
| AREA IDENTIFICATION INFORMATION | AR11 | AR1,Q | AR1,R |
| REPRESENTATIVE POINT COORDINATES | (X11,Z11) | (X12,Z12) | (X13,Z13) |
| MINIMUM ARRIVAL TIME | 10sec | 7.5sec | 2.2sec |
| SPACE EVALUATION POINT | 10 | 2.5 | -2.8 |

733a — AREA IDENTIFICATION INFORMATION
733b — REPRESENTATIVE POINT COORDINATES
735c — MINIMUM ARRIVAL TIME
735f — SPACE EVALUATION POINT

FIG.20

| 736 | MOVEMENT SETTING INFORMATION | |
|---|---|---|
| 736a | KIND OF MOVEMENT | "SUPPORTING BEHIND BALL" |
| 736b | CIRCUMSTANTIAL CONDITION | BALL LIES IN MIDDLE BOARD |
| 736c | ATHLETE SELECTION CONDITIONS | BEING WITHIN PRESCRIBED SHORT PASS RANGE FROM BALL |
| | | BEING BEHIND BALL |
| | | MID FIELDER OR BACKFIELD |
| | | ⋮ |
| 736g | REFERENCE TBL | AREA SETTING TBL OF TEAM ON OWN SIDE |
| 736d | MOVEMENT TARGET POINT SELECTION CONDITION | REPRESENTATIVE POINT Q OF AREA AR WHICH LIES BEHIND BALL AND HAS PREDETERMINED NUMBER OF SPACES OR MORE |
| 736e | MOVEMENT EVALUATION POINT | SPACE EVALUATION POINT/2 × L WEIGHTING FACTOR |
| | KIND OF MOVEMENT | "RUNNING INTO FRONT SPACE" |
| | CIRCUMSTANTIAL CONDITION | BALL LIES IN MIDDLE BOARD |
| | ATHLETE SELECTION CONDITIONS | ATHLETE CAPABLE OF RECEIVING PASS |
| | | BALL LIES IN CENTER, AND ATHLETE LIES IN SIDE |
| | | BALL LIES IN SIDE, AND ATHLETE LIES IN CENTER |
| | | SPACE LIES IN ATTACKING DIRECTION OF ATHLETE |
| | REFERENCE TBL | AREA SETTING TBL OF TEAM ON COMPETITOR SIDE |
| | MOVEMENT TARGET POINT SELECTION CONDITION | REPRESENTATIVE POINT Q OF AREA AR WHICH LIES TOWARD ATTACKING DIRECTION FROM ATHLETE, AND IN WHICH SPACE EVALUATION POINT IS MAXIMUM |
| | MOVEMENT EVALUATION POINT | SPACE EVALUATION POINT/2 × L WEIGHTING FACTOR |
| | ⋮ | |

METHOD OF GAME CHARACTER MOVEMENT CONTROL IN GAME SPACE

BACKGROUND OF THE INVENTION

1. Field of the Invention

The present invention relates to game performing method for executing a given game by controlling the movements of characters constituting a character group in a game space, and by generating an image of the game space.

2. Description of Related Art

A team competing type soccer game for a player team, which a player operates, and a competitor (hereinafter referred to as "COM") team, which a computer automatically operates, to compete in soccer in a sports ground arranged in a virtual space is known as a genre of a video game.

Eleven athlete characters belonging to the player team are composed of a player character, whose actions are operated on operation inputs by the player, and the other non-player characters, whose actions are automatically controlled by the computer. The player character can be arbitrarily selected by the player during the playing of a game, and the player character can be automatically switched according to the whereabouts of a ball. The player operates the player character at important positions to control the whereabouts of the ball, and freely uses dribbles, shots and passing to a non-player character by the player character. Thereby, the player competes with the COM team to enjoy the soccer game.

It is also known that there are some team competing type soccer games which, for example, make a player have a sense nearer to an actual game and make it possible to be contacted with the other athletes well and further make it possible to output encouraging shouts of the athletes as sounds (see, for example, JP-Tokukai-2002-325964A).

To put it concretely, when an athlete on the own side of the player character, which the player operates, keeps a ball, the positional information of all of the athletes on the competitor side and the own side at the point of time is obtained, and the distances and the directions between the player character and the other athletes are detected on the positional information. Then, an athlete existing within a prescribed area from the player character is identified, and whether the identified athlete is one on the own side or not is judged. When the athlete is one on the own side, a sound of an encouraging shout having a content at a sound level, both corresponding to the direction of the athlete, is output. When the athlete is not the one on the own side, an effective sound is output in place of the sound of the encouraging shout.

As described above, in a soccer game, a player almost freely controls a ball, the hold of which is laid by the player team, by operating an arbitrarily selectable player character, and advances the game.

However, because the athletes who are non-player characters other than the player character are always controlled by the computer, the soccer game, which is a team play, cannot be enjoyed when the actions of the non-player characters are not suitably controlled. Consequently, whether the sense of fulfillment from "having played a soccer game" can be provided or not greatly depends on the degree of the likeness of the control of the non-player characters to actual human behaviors.

However, it cannot necessarily be said that the non-player characters are sufficiently controlled in conventional soccer games.

For example, in actual soccer, as one of attacking tactics patterns from the middle board, there is a tactics pattern such that, when there is a space on the goal side of the competitor's position, an athlete keeping a ball kicks the ball toward the space, and at the same time another athlete runs into the space to receive the ball, and further the athlete sends a pass toward a further other athlete running into the center before the goal in order that the athlete running into the center may receives the pass to shoot a shot.

However, in the conventional soccer games, the control of non-player characters with the consideration of geographical power distribution situations such as spaces in the game space has not been performed. Consequently, even when a player finds a space, no non-player characters run into the space. Hence, there has been the case where the tactics pattern described above cannot be realized in a game.

SUMMARY OF THE INVENTION

The present invention was made in view of the problems described above. It is an object of the present invention to realize the movement control of non-player characters according to power distributions in a game space, and to bring the movements of the non-player characters closer to those of actual soccer athletes for heightening the reality of a soccer game.

According to a first aspect of the present invention, a game performing method for executing a given game by controlling movements of characters constituting a character group in a game space and by generating an image of the game space, comprises:

setting a plurality of sample points in the game space;

calculating positions of the respective characters after a prescribed time when the characters keeps a present moving situation;

calculating arrival times of the characters up to the set sample points from the calculated positions as starting points;

recognizing areas pertaining to power of the character group on the calculated arrival times of the characters up to the respective sample points; and controlling the movements of the characters on positions and/or magnitudes of the recognized areas in the game space.

According to a first aspect of the present invention, a game apparatus for executing a given game by controlling movements of characters constituting a character group in a game space, and by generating an image of the game space, comprises:

a point setting section for setting a plurality of sample points in the game space;

an inertia calculation section for calculating positions of the respective characters after a prescribed time when the characters keeps a present moving situation;

an arrival time calculation section for calculating arrival times of the characters up to the set sample points from the calculated positions as starting points;

an area recognition section for recognizing areas pertaining to power of the character group on the calculated arrival times of the characters up to the respective sample points; and a movement control section for controlling the movements of the characters on positions and/or magnitudes of the recognized areas in the game space.

According to the method of the first aspect and the device of the second aspect of the present invention, the areas pertaining to the power of the character group can be recognized on the arrival times of the respective characters up to the plurality of sample points set in the game space, and the movements of the characters can be controlled on the positions and/or the magnitudes of the recognized areas. The areas pertaining to the power of the character group, for example, includes areas where the character group is dominant, areas where the character group is non-dominant, areas outside the power sphere, areas where a character belonging to the character group resides or does not reside. Consequently, it is possible to make the characters act according to the geographical power distributions in the game space.

Moreover, in the calculations of the arrival times, virtual movement positions after a prescribed time in the case where the characters keeps the present moving situations are calculated, and the arrival times from the movement positions to the sample points are calculated. Thereby, the arrival times with the consideration of the inertia of the movements of the characters can be obtained with a little calculation load without the performance of a strict kinetic mechanical simulation to each of the characters.

Preferably, in the method of the first aspect of the present invention, the recognizing the areas includes recognizing the areas on arrival times of the characters capable of arriving fastest to the set respective sampling.

According to the above-described method, it is possible to obtain the same effect as one of the method in accordance with the first aspect of the present invention. Further, the power in the areas can be judged on the lengths of the arrival times to the areas of the characters.

For example, when the power in a plurality of character groups is examined, the arrival times of the characters belonging to one of the character groups and the arrival times of the characters belonging to another character group are compared with one another. It can be judged that the characters having the smaller arrival times can arrive at the areas faster than the other characters. That is, the areas can be judged to be the ones where the character group of the characters having the smallest arrival times is dominant.

Consequently, it is possible for a player to recognize power distributions in a game space precisely to control the characters on the power distributions in sport and the like such as soccer in which there is a plurality of character groups in a game space and the athletes of each character groups complexly moves while competing.

Preferably, in the method of the first aspect of the present invention, the recognizing the areas includes recognizing non-power areas which the power of the character group does not reach.

According to the above-described method, it is possible to obtain the same effect as one of the method in accordance with the first aspect of the present invention. Further, the non-power areas which the power of the character group does not reach, namely the areas corresponding to "spaces" in soccer, can be recognized. Consequently, for example in case of soccer, the characters can be controlled on the positions and/or the magnitudes of the spaces.

Preferably, the method of the first aspect of the present invention, further comprises: setting movement target positions on the recognized non-power areas, wherein the controlling the movements of the characters includes performing control for moving the characters to the set movement target positions.

According to the above-described method, it is possible to obtain the same effect as one of the method in accordance with the first aspect of the present invention. Further, the movement target positions can be set and the characters can be moved on the non-power areas which the power of the character group does not reach.

Preferably, in the method of the first aspect of the present invention, the setting movement target positions includes setting the movement target positions in the recognized non-power areas.

According to the above-described method, it is possible to obtain the same effect as one of the method in accordance with the first aspect of the present invention. Further, the characters can be controlled to move to the non-power areas which the power of the character group does not reach. For example, in case of a soccer game, it becomes possible to make the characters run into spaces.

Preferably, the method of the first aspect of the present invention, further comprises:

selecting a character to be an object of control among the characters constituting the character group on the positions and/or the magnitudes of the recognized areas in the game space, wherein the controlling the movements of the characters includes controlling movements of the character selected as the object of the control.

According to the above-described method, it is possible to obtain the same effect as one of the method in accordance with the first aspect of the present invention. Further, the character to be the object of control can be selected on the positions and/or the magnitudes of the recognized areas in the game space. The magnitudes of the recognized areas in the game space, for example, include the number of connections of the area groups to which the recognized areas are connected, the areas of the recognized areas, and the sizes of the recognized areas.

Consequently, the movement control of the characters can be realized on the principle of the right man in the right place according to geographical power distributions in the game space under the condition of the positions and the magnitudes of the recognized areas in the game space. For example in case of a soccer game, the characters can be controlled to move more rationally and effectively as a team according to the arrangements of the characters of the COM team and own side team, and the like.

Preferably, in the method of the first aspect of the present invention, the given game is a compete type game, in which an attacking direction of the character group is previously determined, and the selecting the character to be the object of the control includes selecting the character to be the object of control with consideration of the attacking direction of the character group.

According to the above-described method, it is possible to obtain the same effect as one of the method in accordance with the first aspect of the present invention. Further, by the selection of the character to be controlled with the condition of the attacking directions of both of the competing character groups, the movement control of the characters can be realized on the principle of the right man in the right place according to geographical power distributions in the game space.

Preferably, in the method of the first aspect of the present invention, the given game is a ball game, and the selecting the character to be the object of the control includes selecting the character to be the object of control with consideration of a position of a ball in the game space.

According to the above-described method, it is possible to obtain the same effect as one of the method in accordance with the first aspect of the present invention. Further, in a ball game, the movement control of the characters can be realized on the principle of the right man in the right place with selection conditions of geographical power distributions and the position of the ball in the game space.

Preferably, in the method of the first aspect of the present invention, the character group includes a first character group and a second character group, the recognizing the areas includes recognizing areas pertaining to power of each of the character group on the arrival times of the respective sample points, and the controlling the movements of the characters includes:

controlling the movements of the characters constituting the first character group on the positions and/or the magnitudes of the recognized areas pertaining to the power of the second character group in the game space; and controlling the movements of the characters constituting the second character group on the positions and/or the magnitudes of the recognized areas pertaining to the power of the first character group in the game space.

According to the above-described method, it is possible to obtain the same effect as one of the method in accordance with the first aspect of the present invention. Further, the movement control of the characters of one character group with the consideration of the positions and/or the magnitudes of the areas pertaining to the power of another character group can be realized.

Preferably, the method of the first aspect of the present invention, further comprises According to the above-described method, it is possible to obtain the same effect as one of the method in accordance with the first aspect of the present invention. Further, and the movement control of the characters with the consideration of the positions and/or the magnitudes of the areas pertaining to the character group of the power of the same party, or own side (the company team), can be realized at the time of the movement control of the characters.

According to a third aspect of the present invention, a storage medium has information recorded thereon, when the information is loaded onto an operating device, the information making the operating device execute the method as described above.

The storage medium includes various kinds of IC memories, a CD-ROM, a DVD, a MO, a memory card, a memory cassette, a hard disk and the like. It is possible to obtain the same effect as one of the method in accordance with the first aspect of the present invention, by making the operating device load the information stored in such storage medium to process the operation.

According to a fourth aspect of the present invention, a data signal embodied in a carrier wave, comprises information used for executing the method as described above.

According to a fifth aspect of the present invention, a program makes the operating device execute the method as described above, when the program is loaded onto an operating device.

BRIEF DESCRIPTION OF THE DRAWINGS

The present invention will become more fully understood from the detailed description given hereinafter and the accompanying drawing given by way of illustration only. However thus are not intended as a definition of the limits of the present invention. Wherein:

FIG. 10A is a view showing an example of an area registration table (TBL) of the first embodiment, and FIG. 10B shows a formula for determining space evaluation points;

FIG. 11 is a view showing an example of movement setting information of the first embodiment;

FIG. 12 is a flow chart for illustrating the flow of the whole process;

FIG. 15 is a flow chart for illustrating the flow of a non-player character NPC movement setting process;

FIGS. 19A and 19B are views showing examples of area registration TBL's of a second embodiment;

FIG. 20 is a view showing an example of movement setting information in the second embodiment;

PREFERRED EMBODIMENTS OF THE INVENTION

First Embodiment:

Next, FIGS. 1-17 will be referred to while a case where a soccer game is executed by means of a household game apparatus is described as a first embodiment to which the present invention is applied.

[Descriptions of Configuration]

Figure 1:
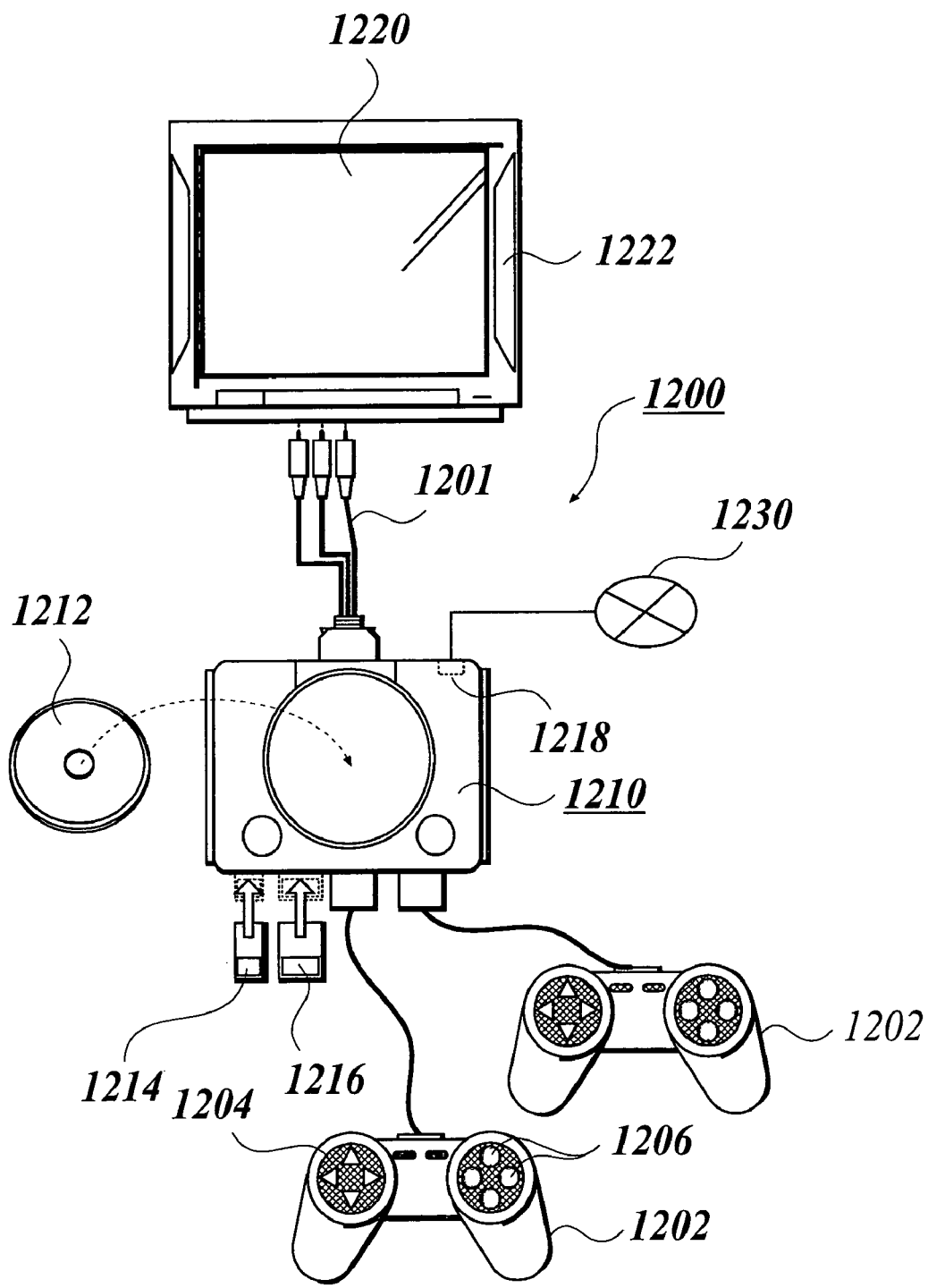
FIG. 1 is a view showing an example of a configuration in the case where the present invention is applied to a household game apparatus.

FIG. 1 is a view showing an example of a configuration in the case where the present invention is applied to a household game apparatus. As shown in the same drawing, the household game apparatus 1200 is provided with game controllers 1202, a main unit 1210, and a display 1220 equipped with speakers 1222. The game controllers 1202 are connected to the main unit 1210, and the main unit 1210 and the display 1220 are connected to each other with cables 1201 capable of transmitting image signals, sound signals and the like.

The game controllers 1202 are each provided with a direction key 1204 and button switches 1206 for a player to input game operations, and the game controllers 1202 output operation input signals to the main unit 1210.

The main unit 1210 is provided with an arithmetic processing unit such as a central processing unit (CPU), and a reader of an information storage medium such as a compact disk read-only memory (CD-ROM) 1212. The main unit 1210 performs the arithmetic processing of various game processes on game information read from the CD-ROM 1212 or the like and operation signals from the game controllers 1202, and generates image signals of game screens and sound signals of game sounds.

The main unit 1210 outputs the generated image signals and the sound signals to the display 1220 to make the display 1220 display game images and to make the speakers 1222 output game sounds. The player observes the game screens displayed on the display 1220 while operating the game controllers 1202 to enjoy the soccer game.

Incidentally, the game information, which is the information such as programs and data, which are necessary for the main unit 1210 to execute the game processes, is stored in, for example, the CD-ROM 1212, an integrated circuit (IC) memory 1214, a memory card 1216 and the like, which are information storage media capable of being freely attached to and detached from the main unit 1210. Alternatively, the game information is obtained from external devices by the connection of the main unit 1210 with communication lines 1230 through a communication device 1218 installed in the main unit 1210. The communication lines 1230 hereupon indicate communication paths capable of transferring data. That is, the communication lines 1230 include communication networks such as telephone communication networks, cable networks and the Internet as well as local area networks (LAN's) such as private lines (private cables) for direct connection and Ethernet (registered trademark). Moreover, the communication system of the communication lines 1230 hereupon does not care whether the communication system is a wired system or whether the communication system is a radio system.

Figure 2:
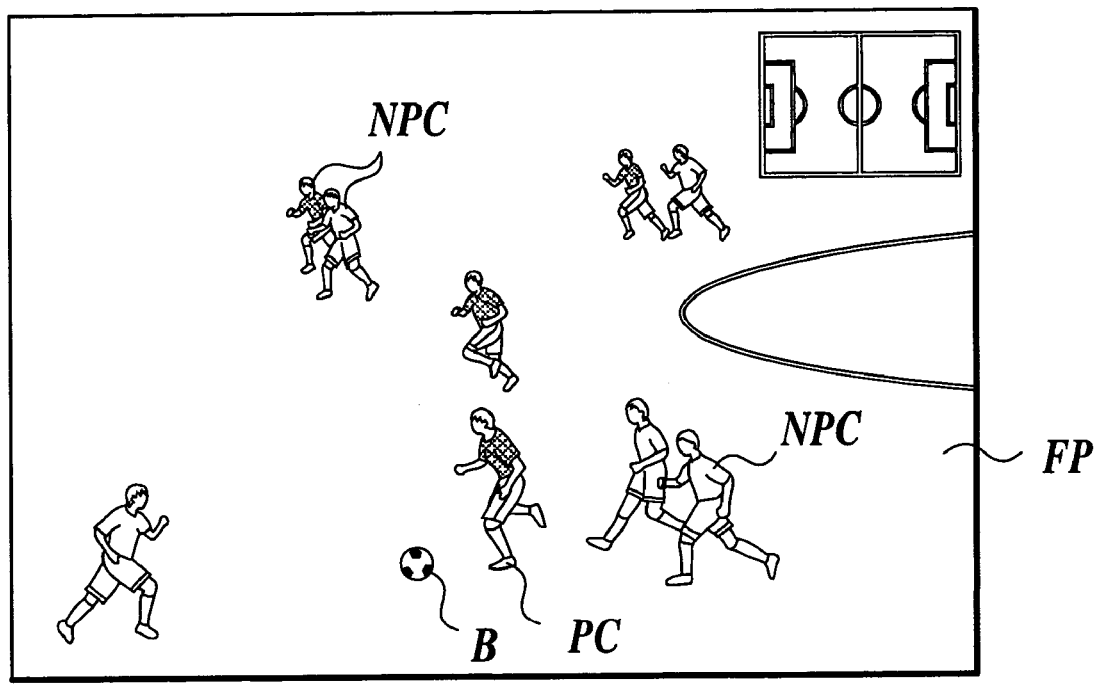
FIG. 2 is a view showing an example of a game screen.

FIG. 2 is a view showing an example of the game screen in the present embodiment. In the same drawing, the athletes of a player team operated by a player and the athletes of a COM team operated by the computer are displayed in different display mode, and the player team is attacking from the right side to the left side on the screen.

In the present embodiment, objects such as a pitch Fp corresponding to a court of soccer, a ball B, and soccer athletes (hereinafter simply referred to as "athletes") corresponding to a player character PC and non-player characters NPC are arranged in an object space. The images of the object space are generated as game images with a given virtual camera to be displayed on the display 1220. Hereupon, the pitch Fp corresponds the court of soccer, and is a range enclosed by touchlines and goal lines.

Any one of the athletes of the player team is arbitrarily selected by the player or is automatically switched according to the whereabouts of the ball B to be the player character (operation athlete) PC which the player operates with the game controllers 1202. The actions of the player character PC such as the movements thereof, passes and shots are controlled in accordance with operation inputs from the game controllers 1202. On the other hand, the athletes other than the player character PC are set as the non-player characters NPC, which are automatically controlled by the computer. In the present embodiment, the movement control of the non-player characters NPC on the offensive side is performed on the basis of the geographical power distributions in the game space.

[Descriptions of Principle]

Next, the principle of the movement control of the non-player characters NPC in the present embodiment will be described.

Figure 3:
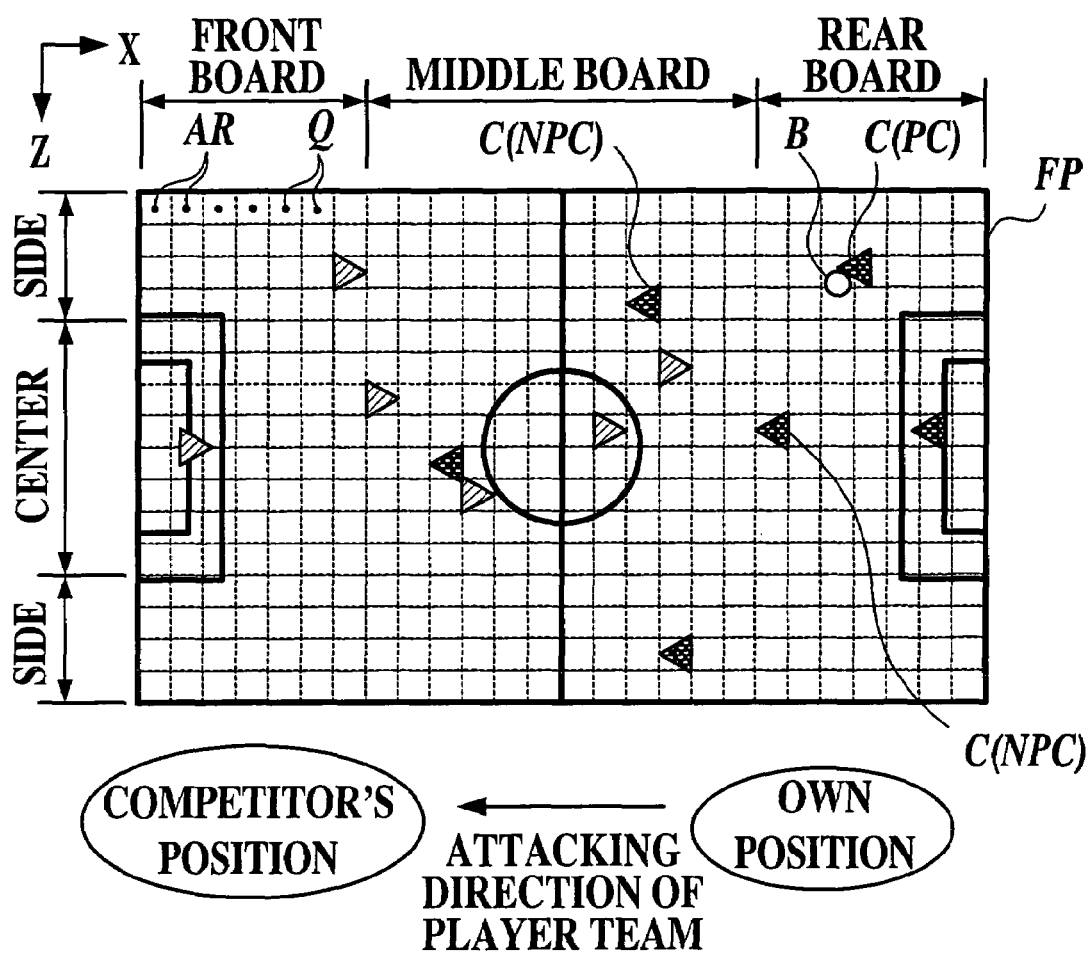
FIG. 3 is a schematic view showing a state of a pitch, which is a soccer court, as seen from a just upper position.

FIG. 3 is a schematic view showing a state of the pitch Fp, which is a soccer court, as seen from a just upper position. In FIG. 3, athletes C are denoted by triangular marks in display modes different by the team, and the attacking directions of the athletes are denoted by the lateral directions of the triangular marks.

In the same drawing, because the player team, which the player operates, attacks from the right side to the left side in the screen, the player team is on the offensive side, and the own position of the player team is the right side. The competitor's position is the left side. Because the COM team attacks from the left side to the right side in the screen, the own position of the COM team is the left side, and the competitor's position is the right side. Because the player character PC keeps the ball B, the player team is on the offensive side and the COM team is on the defensive side.

Each region of the pitch Fp is called by being distinguished as a front board, a middle board and a rear board in the long side direction of the pitch Fp in the order of ranges nearer to the goal of the competitor's position on the basis of the attacking direction, and by being distinguished as sides on both sides and the center in the short side direction of the pitch Fp. For example, when a range of the pitch Fp positioned at the upper left in the screen shown in the same drawing as seen from the player team is appointed, the range is appointed as a range in the "front board" in the "right side".

Mesh-shaped areas AR are set in the pitch Fp arranged in the object space (virtual space). For example, when the long side direction of the pitch Fp is supposed to be an X-axis coordinate and the short side direction is supposed to be a Z-axis coordinate, the areas AR are set on the whole in a matrix along the directions of the X-axis and the Z-axis. Each of the areas AR is identified by a representative point Q having X, Z-coordinate values. A concrete size ratio of each of the areas AR is, for example, one such that each of the areas AR has four sides of about 2 m to the pitch Fp sized in 105 m by 68 m in reduced actual sizes. Each of the representative points Q is set at, for example, almost the position of the center of gravity of each of the areas AR, but the positions of the representative points Q may be appropriately set as long as each of the representative points Q is within a range included in each of the areas AR.

In the present embodiment, the non-player characters NPC are controlled in order that the representative points Q of the areas AR may be movement target points. Then, when which area AR is determined to be a movement target point, space evaluation points are set to be utilized as geographical power information. The space evaluation points are index values indicating the validity of the areas AR as the so-called "spaces".

When an arrival time T for the player character PC or a certain non-player character NPC to reach a certain area AR is equal to a prescribed threshold value or more, the area AR is regarded as a "space".

Figure 4A:
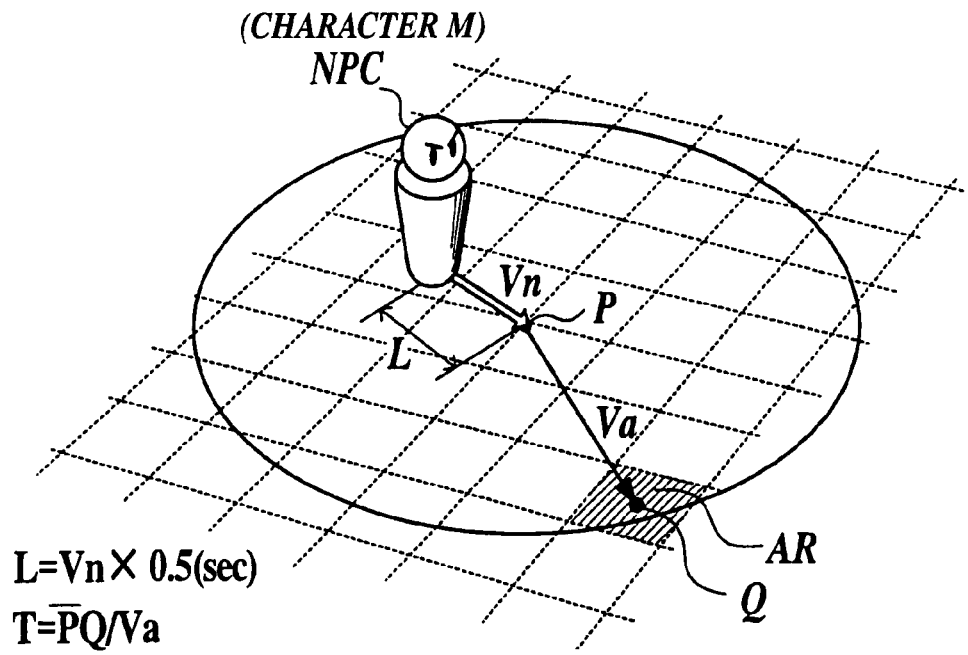
FIGS. 4A and 4B are conceptual views showing a calculation method of arrival times T of a non-player character NPC up to areas AR.
Figure 4B:
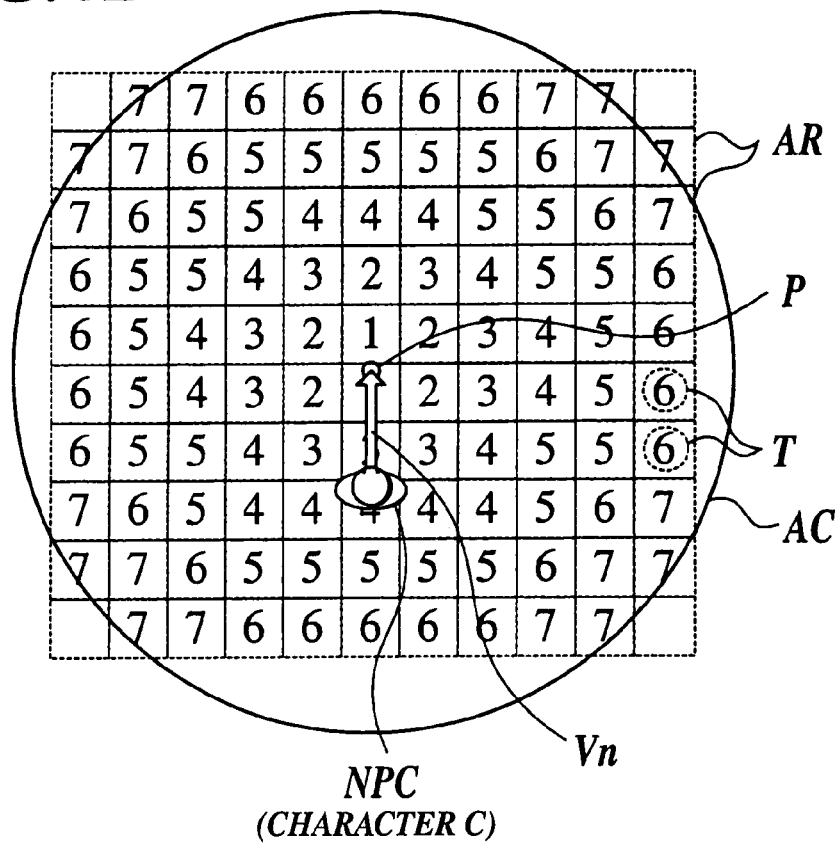

FIGS. 4A and 4B are conceptual views showing a calculation method of the arrival times T of a certain non-player character NPC up to areas AR in the present embodiment.

As shown in FIG. 4A, a virtual movement point P in the case where it is supposed that the non-player character NPC has started a uniform motion at the present velocity Vn of the non-player character NPC from the present position coordinates of the non-player character NPC in the pitch Fp as a starting point and has continued the uniform motion for a prescribed time (e.g. 0.5 seconds) is first obtained. Then, the areas AR the representative points Q of which are included in a prescribed arrival time calculation range AC around the virtual movement point Pare selected. The areas AR will be hereinafter referred to as the "areas AR included in the arrival time calculation range AC". As the arrival time calculation range AC, for example, a range expressed by the X, Z-coordinate values or the polar coordinate values of a range within a radius of 15 m in reduced actual size from the virtual movement point P of an athlete M is set.

Next, the distance PQ from the virtual movement point P to the representative point Q of each of the areas AR included in the arrival time calculation range AC is divided by an ability speed Va, which is one of ability parameters set to each athlete in advance, and the quotient is set as the arrival time T to the area AR. To put it more concretely, for example, the differences of the coordinate values from the virtual movement point P to the representative points Q are reduced to actual distances (by the meter) on the ratios between the size of the actual pitch of 105 m by 68 m and X, Z-coordinate values, and the reduced differences are divided by the ability speed Va (for example, the maximum velocity of the athlete expressed by the m/s). Thereby, the arrival times T are calculated.

When the arrival times T of a certain character C are examined, for example, as shown in FIG. 4B, the arrival times T (each digit in the drawing indicates the rough number of seconds of the arrival time T of the area AR) can be obtained around the virtual movement point P almost in concentric circles.

Figure 5:
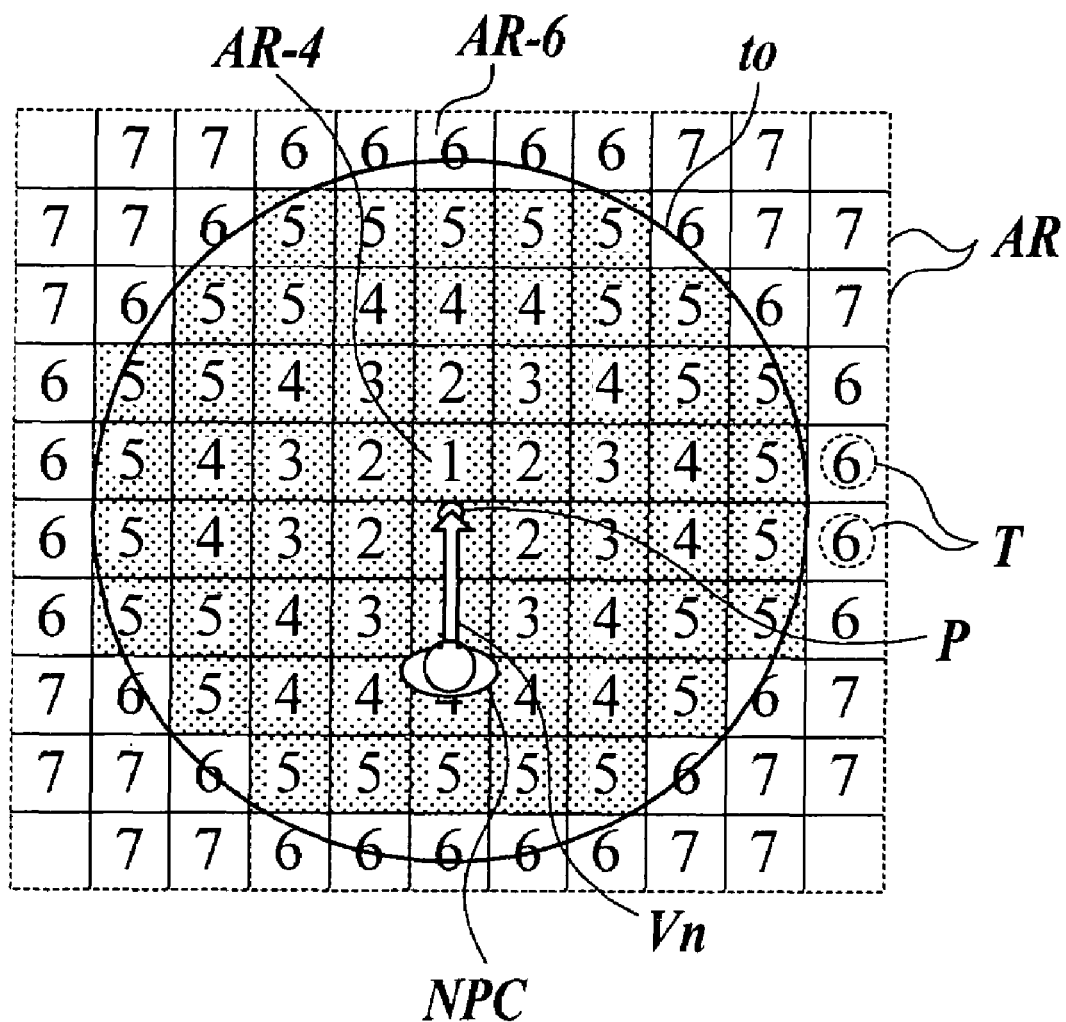
FIG. 5 is a conceptual view for illustrating a calculation method of space evaluation points.

FIG. 5 is a conceptual view for illustrating a calculation method of space evaluation points in the present embodiment. In the present embodiment, the areas AR at which the arrival times T of the non-player character NPC are larger than a prescribed power sphere judging time t0 (for example, five seconds in the same drawing) are judged as spaces, and the areas AR at which the arrival times T are equal to or less than the power sphere judging time t0 are judged to be within a dominant range of the team of the non-player character NPC.

To put it concretely, a subtraction result of the power sphere judging time t0 from the arrival time T to a certain area AR is set as a space evaluation point. Then, the areas AR at which the space evaluation points are positive values are regarded as spaces. For example, when the arrival time T to an area AR-6 is "6.0 seconds", the space evaluation point is "1.0 (=6.0−5)", and the area AR-6 can be judged to be a space. The more an area AR is distant from the non-player character NPC, the larger the arrival time T thereof is. Also the space evaluation point thereof becomes larger in proportion to the distance. Moreover, for example, when an area AR-4 is in the vicinity of the non-player character NPC and the arrival time T thereof is "1.0 second", the space evaluation point thereof is "−4.0 (=1.0−5)". Consequently, the area AR-4 cannot be judged to be a space. That is, whether a certain area AR is a space or not can be known on the basis of the positive or the negative of the space evaluation point of the area AR. When the space evaluation point is a positive value, how much the area AR is distant from the non-player character NPC, i.e. the degree as the space, can be known on the magnitude of the space evaluation point.

Figure 6:
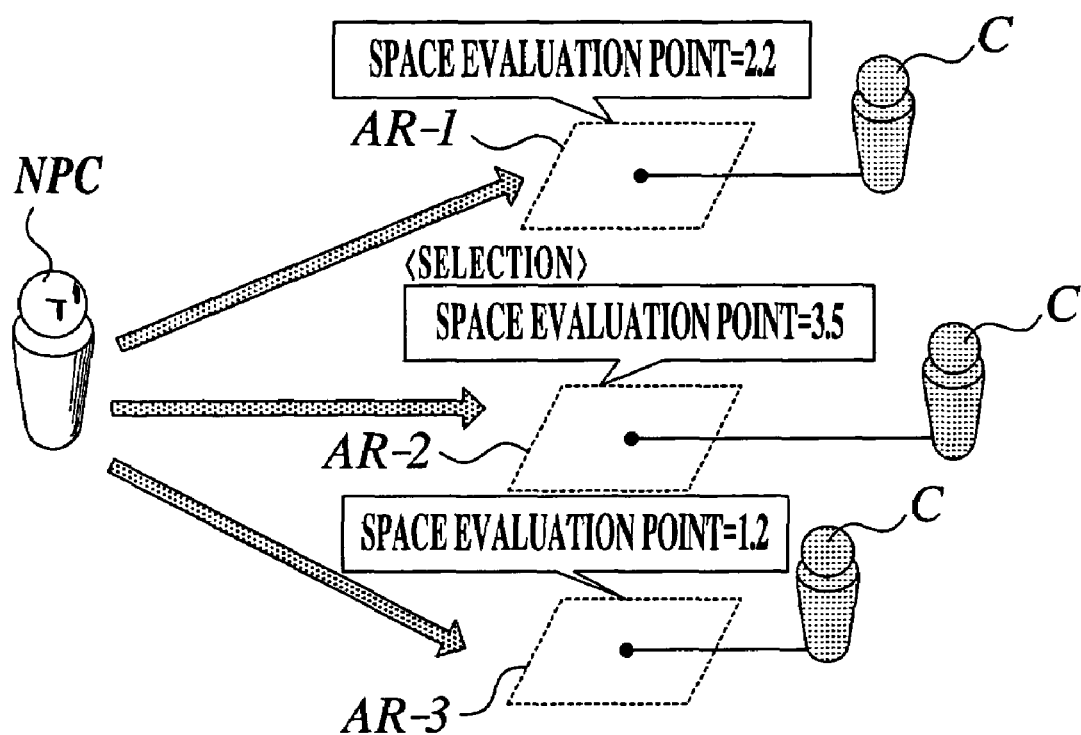
FIG. 6 is a conceptual view for illustrating a selection principle of a movement target point, which principle uses space evaluation points.

FIG. 6 is a conceptual view for illustrating a selection principle of a movement target point using space evaluation points in the present embodiment. As shown in the same drawing, when there are areas AR-1 to AR-3 as the candidates of a movement target point of the non-player character NPC, the space evaluation point of each area AR is referred to.

The highness of the space evaluation point means the highness of the degree as a space. In other words, the highness of the space evaluation point indicates that the movement target point is distant from the athlete C of the COM team by that degree (of course, is distant from the other athletes). Accordingly, an area AR (the area AR-2 in the same drawing) having the highest space evaluation point among the areas AR-1 to AR-3, which are the candidates of the movement target point, is selected as the movement target point of the non-player character NPC. Thereby, it becomes possible to move the non-player character NPC into the area AR which is easy to be used as a space. It is possible to make the non-player character NPC take the actions similar to the ones which can be seen in actual soccer, such as "running into a space".

The present embodiment uses the space evaluation points to determine how to realize an rational action as a team by determining which non-player character NPC in the team executes which movement.

Figure 7:
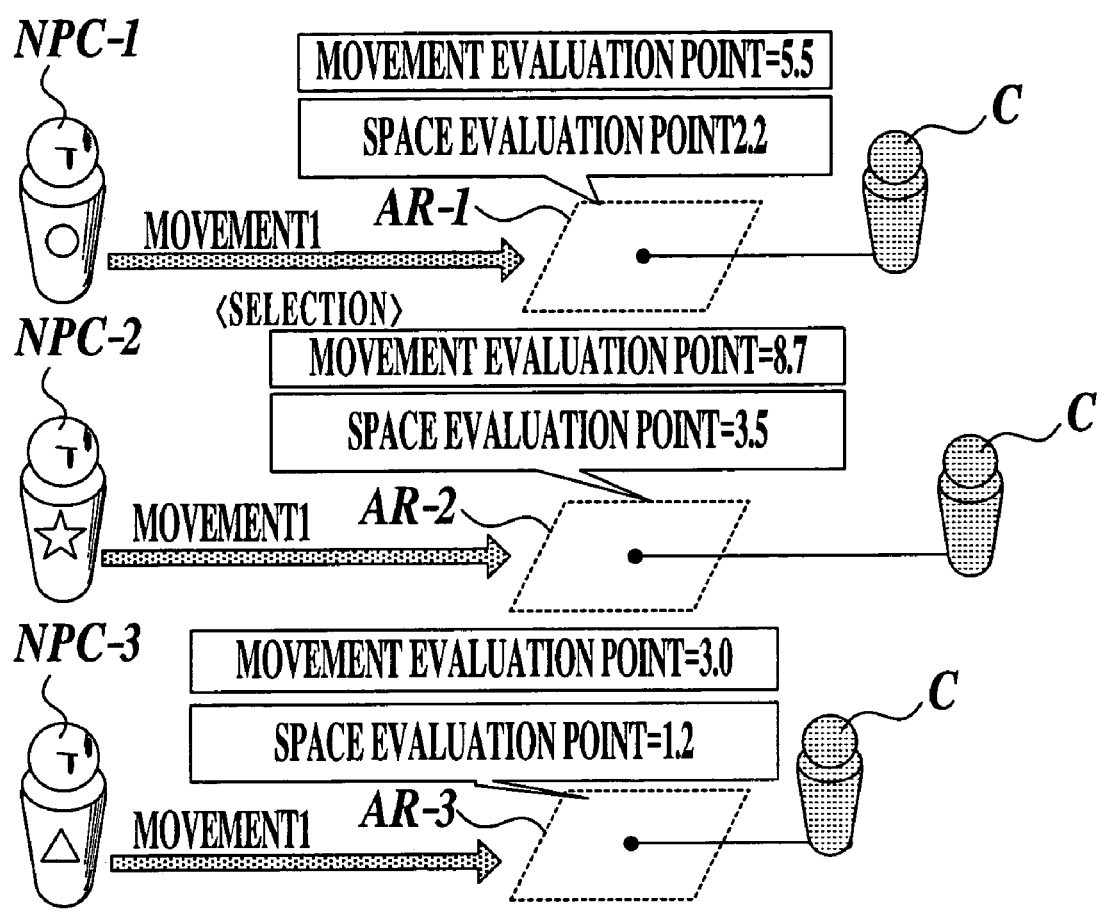
FIG. 7 is a conceptual view for illustrating a principle for determining the movement control of non-player characters NPC.

FIG. 7 is a conceptual view for illustrating a principle for determining the movement control of non-player characters NPC in the present embodiment. In the present embodiment, athlete selection conditions for the selection of an athlete who executes a tactical movement (a movement action) and movement target point selection conditions for the selection of a movement target point are previously prepared correspondingly to each other at every kind of the tactical movement which can be adopted as a team. The kinds of the movements are appropriately set. The settable kinds of the movements, for example, include movements ranging from the positive shift of a position called as "running up by a ball (an action of rushing by the side of an own team athlete keeping the ball into the direction of the competitor's position when the own team athlete is keeping the ball)", "running into the forward space (an action of running into a space existing in the forward direction toward the direction of the competitor's position, or the attacking direction)" and "supporting nearby the ball (an action of approaching the own team athlete keeping the ball and of keeping the state capable of receiving a pass easily)", to the movements with consideration of the balance of the whole team such as a "movement to a formation position (an action of moving to almost the center of an assigned range of the field, which range has been set previously)".

For the determination of each of the non-player characters NPC who executes a certain movement, the movement evaluation point of each athlete is calculated as an index indicating the validity at the time of making each non-player character NPC execute the movement, and the movement action is set to be executed by the non-player character NPC having the highest movement evaluation point.

To put it concretely, for example, in case of the same drawing, non-player characters NPC-1 to NPC-3 satisfying the athlete selection conditions for executing a movement action <movement 1> are selected. To the selected non-player characters NPC-1 to NPC-3, movement target points AR-1 to AR-3 satisfying the movement target point selection conditions based on the present positions of the selected non-player characters NPC-1 to NPC-3 as the starting points are determined, respectively. Then, the movement evaluation points when the non-player characters NPC-1 to NPC-3 execute the movements on the respective space evaluation points of the determined movement target points AR-1 to AR-3 are calculated.

When there is a plurality of non-player characters NPC capable of executing a certain movement, space evaluation points are set to be higher when the movement target points introduced from the respective positional conditions are more advantageously available as spaces. Consequently, also the movement evaluation points to be calculated become higher. In the same drawing, when the same kind of movement is executed, the movement evaluation point of the non-player character NPC-2 having the movement target point of the area AR-2, which has the highest space evaluation point, is the highest. Consequently, the non-player character NPC-2 is set as the non-player character NPC who executes the movement.

Consequently, by the execution of a movement action by the non-player character NPC having the highest movement evaluation point, the most rational movement allocation as a team can be performed on the positional relationships of the athletes on each occasion like in actual soccer.

[Descriptions of Functional Blocks]

Figure 8:
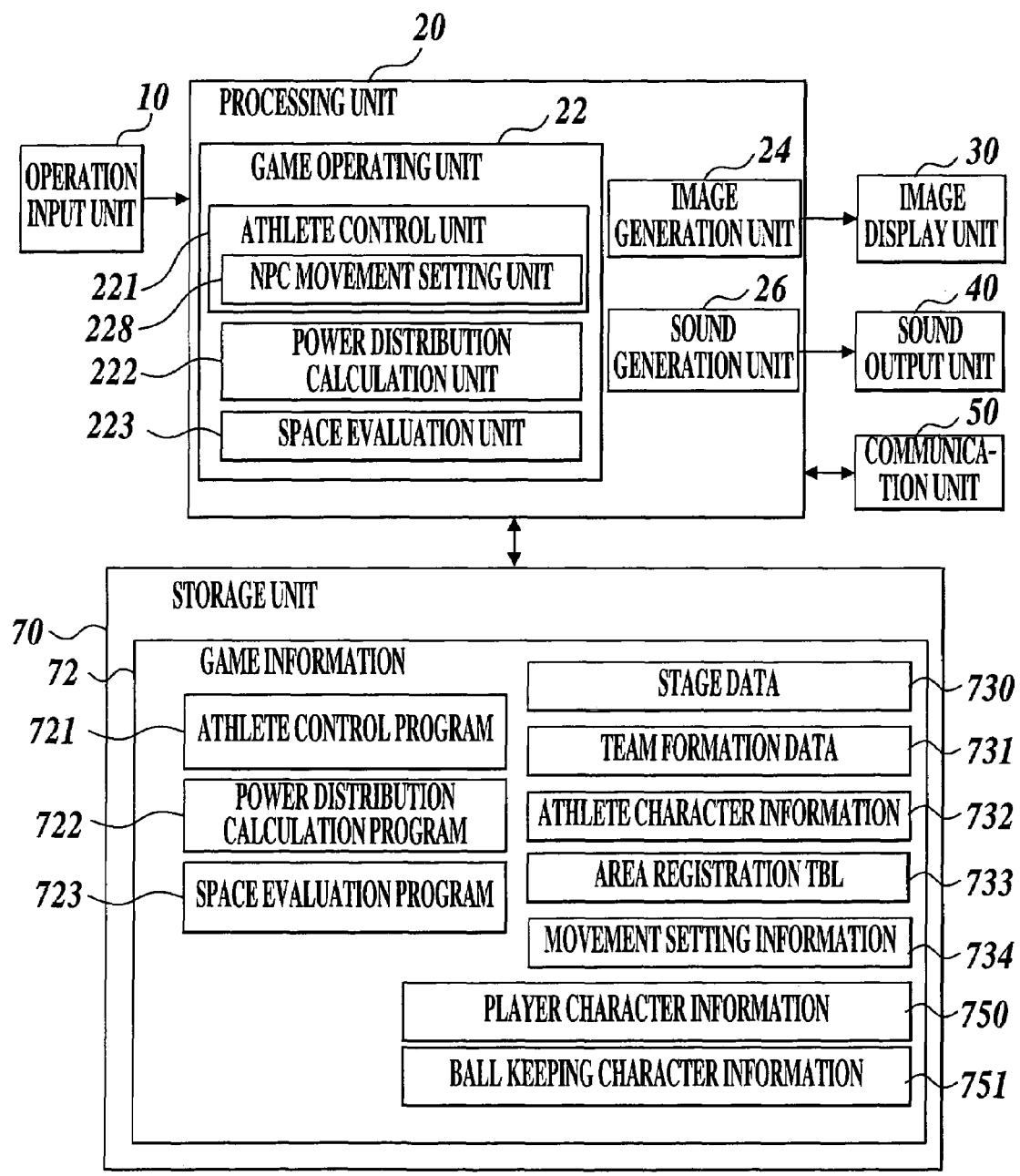
FIG. 8 is a functional block diagram showing an example of the functional constitution of a first embodiment.

FIG. 8 is a functional block diagram showing an example of the functional constitution of the present embodiment. As shown in the same drawing, the household game apparatus 1200 includes an operation input unit 10 for inputting operations of a player, a processing unit 20 bearing the arithmetic processing pertaining to the control of the apparatus 1200 and games, an image display unit 30 for performing the display output of a game screen, a sound output unit 40 for performing the sound output of game sounds, a communication unit 50, and a storage unit 70 for storing various programs and data.

The operation input unit 10 is realized by, for example, a button switch, a lever, a dial, a mouse, a keyboard, and various sensors. The operation input unit 10 outputs operation inputs by the player into the processing unit 20 as operation input signals. In the present embodiment, the game controllers 1202 shown in FIG. 1 correspond to the operation input unit 10.

The processing unit 20 performs various kinds of arithmetic processing such as the whole control of the household game apparatus 1200 and game arithmetic. The functions of the processing unit 20 are realized by hardware such as a CPU (of a complex instruction set computer (CISC) type or of a reduced instruction-set computer (RISC) type) and an application-specific integrated circuit (ASIC) (such as a gate array), related control programs and the like. The arithmetic processing unit such as the CPU and the like which are installed in the main unit 1210 shown in FIG. 1 correspond to the processing unit 20.

Moreover, the processing unit 20 includes a game operating unit 22 for performing arithmetic processing pertaining to games chiefly, an image generation unit 24 for generating image signals for displaying game screens on various kinds of data obtained by the processing of the game operating unit 22, and a sound generation unit 26 for generating sound signals for outputting game sounds such as effective sounds and back ground music (BGM).

The game operating unit 22 executes various game processes for executing soccer games on operation input signals from the operation input unit 10, and the programs and the data which are read from the storage unit 70. The game operating unit 22, for example, executes processes of arranging the objects such as the pitch Fp, the athlete characters and the ball B into the virtual space to perform the movement control of the arranged objects, the crossing judgments (hit checks) of the objects, the calculations of line judgments, the switching judgments of the attacking side and the defensing side, the calculations of game results (records), the arrangements of a virtual camera (visual points), the determination of sight line directions and the angles of view, and the like.

The game operating unit 22 of the present embodiment includes an athlete control unit 221, a power distribution calculation unit 222, and a space evaluation unit 223.

The athlete control unit 221 executes the control of the movements and the actions of the player character on operation signals input from the operation input unit 10, and executes the automatic control of the movements and the actions of the non-player characters NPC. Moreover, the athlete control unit 221 executes the selection setting of the player character, and executes the setting of a character keeping the ball. Furthermore, the athlete control unit 221 includes an NPC movement setting unit 228 for setting the actions of the movements of the respective non-player characters NPC on the offensive side.

The power distribution calculation unit 222 obtains geographical power distributions in game spaces. To put it concretely, the power distribution calculation unit 222 calculates the arrival times T of all athletes including the player character PC and the non-player characters NPC on the pitch Fp up to their arrivals to the representative points Q of the respective areas AR included in an arrival time calculation range AC, and judges the minimum arrival times Ts at the respective areas AR. Then, the power distribution calculation unit 222 judges the respective areas AR as being within the power sphere of the team of the athlete who can arrive the areas AR at the minimum arrival times Ts. The judgement results pertaining to the power distributions of the respective areas AR are managed in the state of being stored in the storage unit 70 as an area registration TBL 733.

The space evaluation unit 223 calculates space evaluation points of the respective areas AR in the pitch Fp on the minimum arrival times Ts obtained by the power distribution calculation unit 222.

The image generation unit 24 is realized by, for example, an arithmetic unit such as a CPU and a digital signal processing (DSP), the control program of the arithmetic unit, an IC memory for a drawing frame such as a frame buffer, and the like. The image generation unit 24 executes geometrical conversion processes or shading processes on the operation results of the game operating unit 22 to generate three dimensional computer graphic (3-D CG) images for displaying game screens, and outputs the image signals of the generated images to the image display unit 30.

The sound generation unit 26 is realized by an arithmetic unit such as a CPU and a DSP, and the control program of the arithmetic unit. The sound generation unit 26 generates sounds such as effective sounds and BGM which are used in games, and outputs the sound signals to the sound output unit 40.

The image display unit 30 redraws one frame of a screen, for example, at every 1/60 second on the image signals from the image generation unit 24 while displaying game screens. The image display unit 30 can be realized by hardware such as a cathode ray tube (CRT), a liquid crystal display (LCD), an electroluminescent device (ELD), a plasma display panel (PDP), a helmet-mounted display (HMD) and the like. In the embodiment shown in FIG. 1, the display 1220 corresponds to the image display unit 30.

The sound output unit 40 is a device for performing the sound output of effective sounds, BGM and the like on the sound signals from the sound generation unit 26. In the embodiment shown in FIG. 1, the speaker 1222 corresponds to the sound output unit 40.

The communication unit 50 is connected to a communication line for performing data communication with external devices. The communication unit 50 is realized by, for example, a module, a modem and a terminal adapter (TA) in accordance with Bluetooth (registered trademark), Infrared Data Association (IrDA) or the like, a jack of a communication cable for wired communication, a control circuit, and the like. The communication device 1218 shown in FIG. 1 corresponds to the communication unit 50. Incidentally, the information pertaining to the protocols and the like supplied by the communication unit 50 at the time of communication is stored in, for example, the storage unit 70, and the stored information is suitably read to be used.

The storage unit 70 stores a system program (not shown) for realizing the functions for making the processing unit 20 control the household game apparatus 1200 in an integrated manner, game information 72 storing programs and data necessary for the execution of games, and the like. The storage unit 70 can be realized by information storage media such as various IC memories, hard disks, CD-ROM's, magneto optical disks (MO's), digital versatile discs (DVD's) and the like. In the embodiment shown in FIG. 1, the CD-ROM 1212, the IC memory 1214 and the memory card 1216 correspond to the storage unit 70.

The game information 72 includes programs and data for making the processing unit 20 function as the game operating unit 22. The programs especially include (1) an athlete control program 721 for making the processing unit 20 function as the athlete control unit 221, (2) a power distribution calculation program 722 for making the processing unit 20 function as the power distribution calculation unit 222, and (3) a space evaluation program 723 for making the processing unit 20 function as the space evaluation unit 223.

Moreover, as the data, the game information 72 stores stage data 730 storing the object data for displaying the pitch Fp, the ball B and the like, team formation data 731 storing the identification information of the characters belonging to the player team and the COM team, athlete character information 732, the area registration TBL 733, and movement setting information 734 storing the conditions of movement target points.

As the data to be suitably updated during the execution of a game, the game information 72 stores player character information 750 storing the identification information of the player character PC, and ball keeping character information 751 storing the identification information of a character keeping the ball B. In the ball keeping character information 751, the identification information of an athlete (character) who is judged to keep the ball B among all of the athletes in the player team and the COM team is stored. When no characters keep the ball B, the information of the processing indicating the nonexistence of the character is stored.

Moreover, although it is not shown, various kinds of data such as scores and playing times with regard to the execution of a soccer game are supposed to be suitably stored temporarily.

Figure 9:
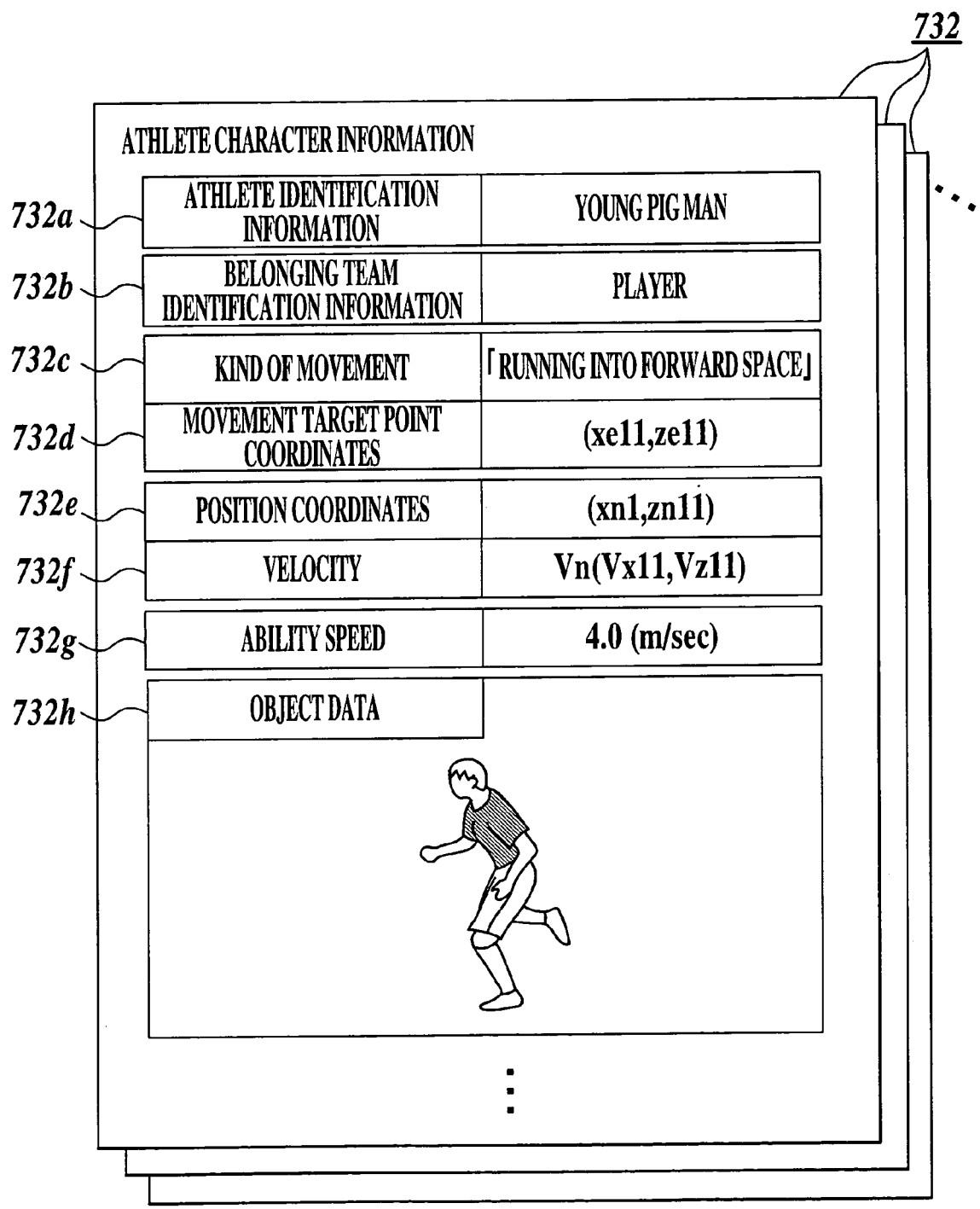
FIG. 9 is a view showing an example of athlete character information.

FIG. 9 is a view showing an example of the athlete character information 732 in the present embodiment. The athlete character information 732 correspondingly stores athlete identification information 732a, which is prepared to each athlete and stores the name of the athlete and the like, belonging team identification information 732b, a kind of movement 732c storing the identification information of the kind of a movement action, movement target point coordinates 732d storing the coordinates of the representative point Q of an area AR set as a movement target point, position coordinates 732e on the present pitch Fp, a velocity 732f storing the present velocity Vn (which is a vector value including a magnitude and a direction), an ability speed 732g, which is one of ability parameters, and object data 732h storing model data and texture data for the display of the athlete.

When the kind of movement 732c is set, the setting indicates that the athlete is executing the set movement, and that the athlete is on the way to the movement target point coordinates 732d. When the athlete arrives at the movement target point coordinates 732d, the prescribed information indicating that the kind of movement is not set is stored in the kind of movement 732c.

The aforesaid athlete control unit 221 and the NPC movement setting unit 228 update the kind of movement 732c, the movement target point coordinates 732d, the position coordinates 732e, and the velocity 732f of the athlete character information 732 to control the movements and the actions of each character.

FIG. 10A is a view showing an example of the area registration TBL 733 of the present embodiment, and FIG. 10B shows a formula for determining space evaluation points. As shown in FIG. 10A, the area registration TBL 733 correspondingly stores area identification information 733a of areas AR, representative point coordinates 733b of representative points Q, the minimum arrival times Ts (733c), which are judged by the power distribution calculation unit 222, dominant athlete identification information 733d of the characters who can arrive at the areas AR at the minimum arrival times Ts, dominant team identification information 733e storing the belonging team identification information of the characters, and space evaluation points 733f set by the aforesaid space evaluation unit 223.

FIG. 11 is a view showing an example of the movement setting information 734 of the present embodiment. The movement setting information 734 correspondingly stores to every kind of movement 734a, which is distinguished on tactical meanings, a circumstantial condition 734b storing the condition of the game situation, under which the movement is selected, athlete selection conditions 734c storing conditions for the selection of the athlete who executes the movement, a movement target point selection condition 734d storing the condition of the position and/or the magnitude of the movement target point of the movement, and a movement evaluation point 734e storing an index or a calculation formula of the index, which index indicates the priority degree of the movement action.

The circumstantial condition 734b stores various flags and parameters which indicate game situations to define the conditions of the game. The athlete selection conditions 734c and the movement target point selection condition 734d define the conditions by means of, for example, coordinate ranges in the X, Z-coordinates in the pitch Fp, threshold values and the like.

The movement evaluation point 734e is calculated, for example, by the multiplication of the space evaluation point at the movement target point of the movement by the peculiar weighting constant of the movement. That is, a movement action having a movement target point in an area AR at which the space evaluation point is higher and which is easier to use as a space has a higher point.

Incidentally, the "front" in FIG. 11 indicates the offensive side direction, namely the direction on the competitor's position side. On the other hand, the "behind" in FIG. 11 indicates the defensive side direction, namely the direction on the own position side.

[Descriptions of Process Flow]

Next, FIGS. 12-16B will be referred to while the flows of the processes pertaining to the movement control of the non-player characters NPC on the offensive side in the present embodiment are described.

The processes described here are realized by the processing unit 20 by reading the athlete control program 721, the power distribution calculation program 722 and the space evaluation program 723 to execute them.

FIG. 12 is a flow chart for illustrating the flow of the whole process in the present embodiment. First, as a preparation step before the starting of a game, the game operating unit 22 arranges objects such as the pitch Fp, the ball B and athletes in an object space (Step S2).

Next, the athlete control unit 221 initializes the kinds of movements of all athletes (Step S4). For example, the athlete control unit 221 initializes the kinds of movements by setting "return to formation positions".

Next, the athlete control unit 221 sets a prescribed athlete in the player team as the player character PC (Step S6). For example, the prescribed athlete may be a captain athlete appointed by a player before the start of the game. Then, when the player character PC is set, a game play is started.

After the start of the game play, the power distribution calculation unit 222 first executes a power distribution calculation process to obtain a power distribution in the present game situation (Step S8).

Figure 13:
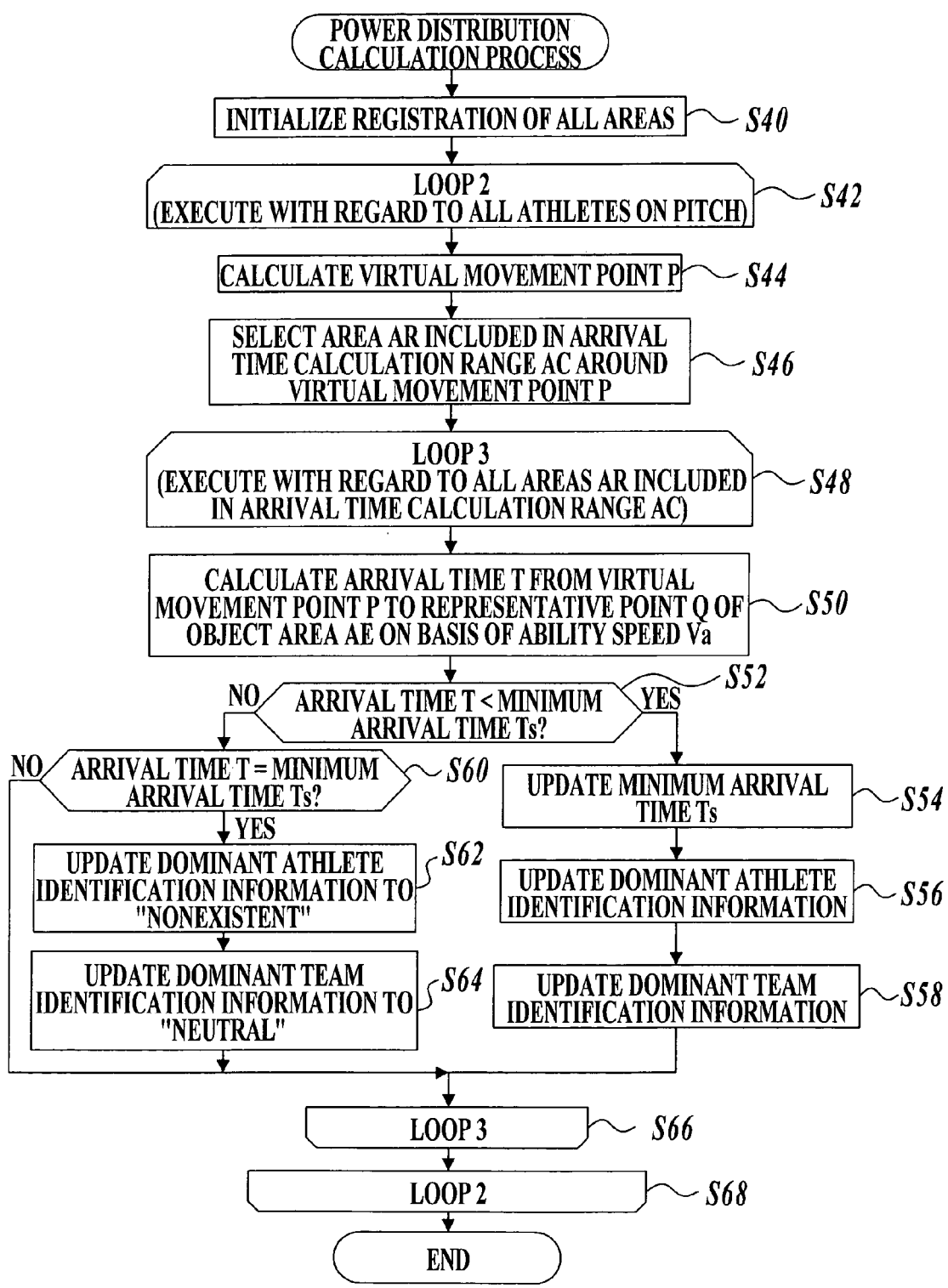
FIG. 13 is a flow chart for illustrating the flow of a power distribution calculation process of the first embodiment.

FIG. 13 is a flow chart for illustrating the flow of the power distribution calculation process of the present embodiment. As shown in the same drawing, the area registration TBL 733 is first initialized (Step S40). To put it concretely, prescribed default values (for example, 10 seconds) are stored in the minimum arrival times Ts (733*c*) of all of the areas AR. Prescribed values of "nonexistence" are stored in the dominant athlete identification information 733*d* of all of the areas AR. Prescribed values of "neutrality" are stored in the dominant team identification information 733*e*. Moreover, "10" is stored in the space evaluation points 733*f* as a default value to initialize the space evaluation points 733*f*.

Next, a loop 2 is executed in order to each athlete including the player character PC and the non-player characters NPC (Steps S42-S68).

In the loop 2, the position coordinates of the virtual movement point P of an athlete who is a process object are calculated (Step S44). To put it concretely, the position coordinates 732*e* and the velocity 732*f* in the athlete character information 732 are referred to while the position coordinates which the athlete reaches from the present position thereof at the velocity Vn after 0.5 second are calculated.

Next, areas AR to be objects to which the arrival times T of the athlete character around the virtual movement point P are calculated are selected (Step S46). To put it concretely, the representative point coordinates 733*b* of the area registration TBL 733 are referred to for the selection of the areas AR included in the arrival time calculation range AC from the position of the virtual movement point P of the athlete. Then, the area identification information 733*a* of the selected areas AR is temporarily stored in the storage unit 70.

Next, the power distribution calculation unit 222 sequentially executes a loop 3 (Steps S48-S66) to each of the areas AR included in the arrival time calculation range AC of the athlete of the processing object.

In the loop 3, the arrival time T of the athlete from the virtual movement point P to the representative point Q of the area AR of the processing object is first calculated (Step S50). To put it concretely, the distance from the virtual movement point P to the representative point Q is calculated, and the calculated distance is multiplied by a prescribed ratio to be reduced to an actual size distance (for example, to a size expressed by meters) Then, the ability speed 732*g* in the athlete character information 732 is referred to for the calculation of the arrival time T by the division of the reduced value by the ability speed Va.

Next, the calculated arrival time T is compared with the minimum arrival time Ts (733*c*) registered in the area AR (Step S52).

When the calculated arrival time T is smaller than the registered minimum arrival time Ts (YES at Step S52), the power distribution calculation unit 222 registers the calculated arrival time T in the minimum arrival time 733*c* of the area AR to update the value of the minimum arrival time 733*c* (Step S54), and registers the athlete identification information 732*a* of the athlete in the dominant athlete identification information 733*d* to update the data of the dominant athlete identification information 733*d* (Step S56). Moreover, the power distribution calculation unit 222 registers the belonging team identification information 732*b* of the athlete in the dominant team identification information 733*e* to update the data of the dominant team identification information 733*e* (Step S58). Then, the loop 3 is ended.

When the calculated arrival time T is equal to the minimum arrival time Ts which has already registered to the area AR (NO at Step S52→YES at Step S60), the power distribution calculation unit 222 registers the prescribed information indicating the "nonexistence" of the pertinent athlete to the dominant athlete identification information 733*d* of the area AR (Step S62), and registers the prescribed information indicating "neutrality" to the dominant team identification information 733*e*(Step S64). Then, the loop 3 is ended.

When the loop 3 is ended, the process is similarly executed to the next athlete. When the loop 2 has been executed to all of the athletes on the pitch Fp, the power distribution calculation process is ended.

Next, in FIG. 12, the space evaluation unit 223 executes a space evaluation process (Step S9).

Figure 14:
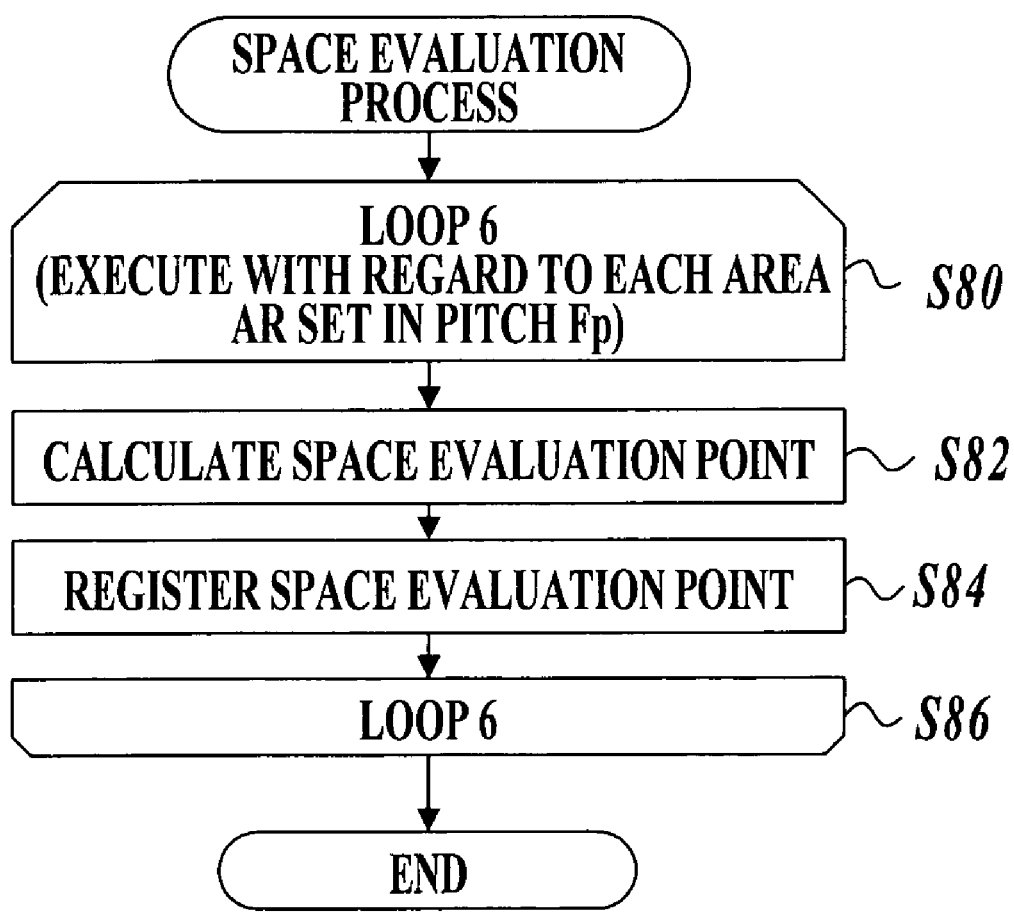
FIG. 14 is a flow chart for illustrating the flow of a space evaluation process.

FIG. 14 is a flow chart for illustrating the flow of the space evaluation process in the present embodiment. As shown in the same drawing, the space evaluation unit 223 sequentially executes the process of a loop 6 (Steps S80-S86) to each of the areas AR set in the pitch Fp.

In the loop 6, the space evaluation unit 223 first calculates the space evaluation point 733*f* of the area AR of the processing object (Step S82), and registers the calculated space evaluation point 733*f* in the area registration TBL 733 (Step S84).

To put it concretely, the space evaluation unit 223 refers to the minimum arrival time 733*c* of the area AR of the processing object in the area registration TBL 733 to subtract the referred minimum arrival time 733*c* from the power sphere judging time t0 (t0=5 seconds in the present embodiment), and then the space evaluation unit 223 registers the subtraction value in the space evaluation point 733*f*. For example, in case of FIGS. 10A and 10B, in the area AR11, the space evaluation point 733*f* is "1.8" (=5−3.2), and then the space evaluation point 733*f* takes a positive value. Moreover, in the area AR12, the space evaluation point 733*f* is "−0.2" (=5−5.2). Incidentally, the areas AR having the minimum arrival time Ts of "10" is judged to be spaces being far distant from any athletes of both of the teams, and a prescribed value (for example, "10") is stored in the space evaluation point 733*f* of the areas AR.

Then, when the loop 6 has been executed to all of the areas AR in the pitch Fp, the space evaluation process is ended.

Next, in FIG. 12, the athlete control unit 221 controls the movement of the player character PC on an operation input signal input from the operation input unit 10 (Step S10). That is, the action of the player character PC is determined and controlled on the operation inputs input from the game controllers 1202 by the player.

Next, the NPC movement setting unit 228 executes an NPC movement setting process to determine the kinds of movements of the non-player characters NPC on the offensive side except the player character PC (Step S12).

FIG. 15 is a flow chart for illustrating the flow of the NPC movement setting process of the present embodiment. As shown in the same drawing, the NPC movement setting unit 228 first selects the non-player characters NPC of the team on the offensive side except the characters who are moving now and the character who keeps the ball B (Step S102). To put it concretely, the NPC movement setting unit 228 refers to the athlete character information 732 to judge the characters having the identification information of the kind of movement stored in the kind of movement 732c to be ones who are moving toward movement target points, and the NPC movement setting unit 228 does not set the characters to be objects of the selection. Moreover, the NPC movement setting unit 228 refers to the ball keeping character information 751 not to set the character keeping the ball B to be an object of the selection.

Next, the NPC movement setting unit 228 selects the kinds of movements satisfying the circumstantial condition 734b in the movement setting information 734 (Step S104), and sequentially executes the process of a loop 4 (Steps S106-S122) of the selected kind of movement.

In the loop 4, the NPC movement setting unit 228 selects the non-player characters NPC satisfying the athlete selection conditions 734c of the kind of movement 734a among the non-player characters NPC who belong to the team on the offensive side and do not keep the ball B (Step S108), and the NPC movement setting unit 228 sequentially executes the process of a loop 5 to each of the selected non-player characters NPC (Steps S110-S118).

In the loop 5, the NPC movement setting unit 228 first determines an area AR satisfying the movement target point selection condition 734d (Step S112). When a plurality of areas AR satisfies the movement target point selection condition 734d, the random selection of the areas AR is performed to narrow down the areas AR to one. Next, the NPC movement setting unit 228 refers to the space evaluation point 733f set to the area AR selected as the movement target point in the area registration TBL 733 (Step S114), and calculates the movement evaluation point of the kind of movement (Step S116). The NPC movement setting unit 228 temporarily stores the calculated movement evaluation point in the storage unit 70 correspondingly to the athlete identification information 732a of the non-player character NPC of the processing object.

When the NPC movement setting unit 228 has executed the process of the loop 5 to all of the non-player characters NPC satisfying the athlete selection conditions 734c of the kind of movement 734a, the loop 5 is ended.

When the loop 5 has ended, the NPC movement setting unit 228 retrieves the non-player character NPC having the highest movement evaluation point to set the kind of movement 734a as the movement of the retrieved non-player character NPC (Step S120). That is, the NPC movement setting unit 228 stores the kind of movement 734a in processing into the kind of movement 732c of the athlete character information 732 of the retrieved non-player character NPC, and stores the coordinate values of the representative point Q of the previously determined area AR of the movement target point of the non-player character NPC into the movement target point coordinates 732d.

Then, when the NPC movement setting unit 228 has determined each of the athletes who executes each of the movements on the movement setting information 734, the NPC movement setting unit 228 ends the loop 4, and ends the NPC movement setting process.

Next, in FIG. 12, the athlete control unit 221 controls the movements of the non-player characters NPC on the offensive side (Step S14). That is, the athlete control unit 221 moves each of the non-player characters NPC on the offensive side to the movement target point coordinates 732d in accordance with the definition of the kind of movement 732c of the corresponding athlete character information 732. When the athlete control unit 221 has completed the movements, the athlete control unit 221 stores the information indicating "nonexistence of setting" (for example, "0") in the kind of movement 732c.

Next, the athlete control unit 221 executes the movement control of the non-player characters NPC on the defensive side (Step S16), and controls the movements of the objects such as the ball B other than the player character PC and the non-player characters NPC (Step S18). Incidentally, the movement control at Steps S14-S18 is suitably executed in accordance with known control techniques.

When the movement control of the objects has been completed, the game operating unit 22 executes a game judgement process (Step S20). The judgment of the player character and the judgment of the character keeping the ball B are executed at this step.

When the offense and the defense are reversed as a result of the game judgment (YES at Step S22), the athlete control unit 221 stores the information indicating the "nonexistence of setting" (for example, "0") to the kinds of movements 732c of all of the athletes (Step S24).

Next, the image generation unit 24 generates an image signal of a game screen (Step S26), and the image display unit 30 displays the game screen (Step S28). Then, the game operating unit 22 executes the judgment of the end of the game. When a prescribed ending condition is not satisfied (NO at Step S30), the game operating unit 22 returns the process to Step S8 to continue the game. When the ending condition is satisfied (YES at Step S30), the game operating unit 22 ends the soccer game.

According to the processes described above, the movement control coping with geographical power distribution states in the game space such as the movements of the non-player characters NPC who belong to the team on the offensive side and do not keep the ball B into spaces can be realized. Moreover, because the movements can be executed by the non-player characters NPC selected on the space evaluation points, the movements are most strategically effective for a team in the game situation at that time.

An example in a more concrete situation will be described.

Figure 16A:
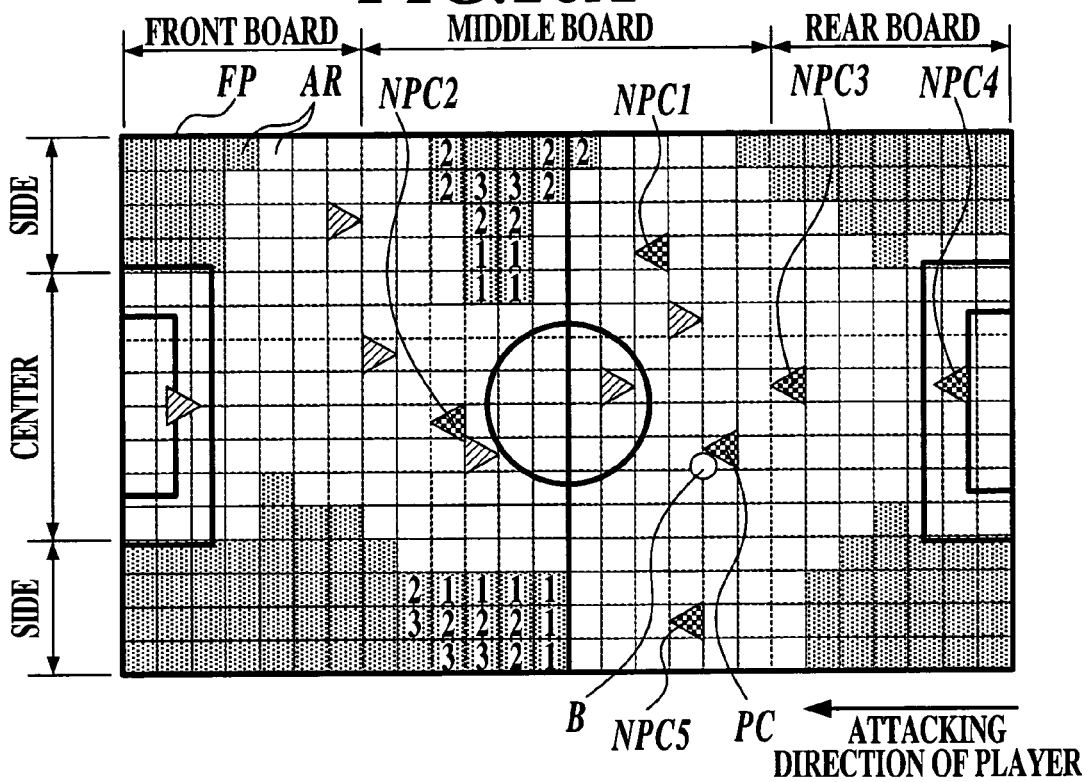
FIGS. 16A and 16B are schematic views for illustrating an example of the control of non-player characters NPC in the kind of movement "running into forward space"
Figure 16B:
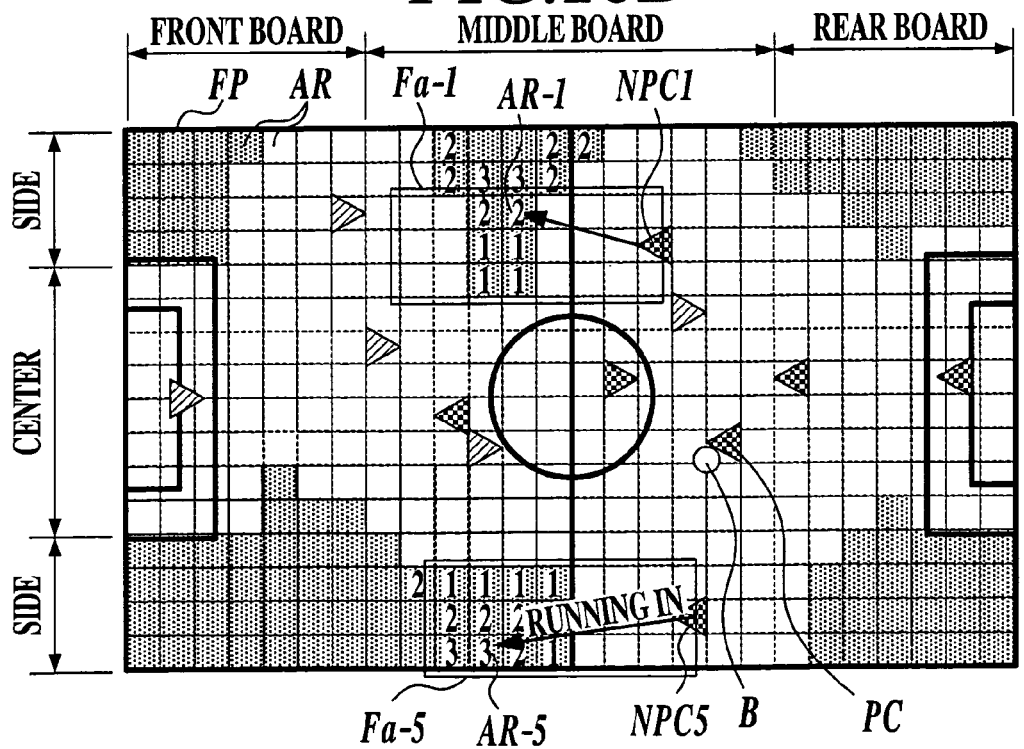

For example, FIGS. 16A and 16B are schematic views for illustrating an example of the control of the non-player characters NPC in the kind of movement "running into forward space". In the situation shown in FIG. 16A, a player character PC and five non-player characters NPC1-NPC5 are shown as the characters belonging to the player team. Because the player character PC keeps the ball B, the player team is on the offensive side. Incidentally, the areas AR displayed with shading indicate that the areas AR are spaces, and the digits recorded in parts of the areas AR indicates approximate values of the space evaluation points of the areas AR.

When the game situation shown in FIG. 16A is compared with the circumstantial conditions 734b of the movement setting information 734 shown in FIG. 11, the kind of movement 734a "running into forward space" is selected as the action of an executable movement (correspondingly to Step S104) because the ball B is in the range of the middle board in the pitch Fp.

When the athlete selection conditions 734c shown in FIG. 11 are examined in order from the upper side for the selection of the non-player character NPC who executes the kind of movement 734a "running into forward space", the non-player characters NPC1 and NPC5, each being an athlete positioned in a side and capable of receiving a pass, are selected as the candidates for receiving the pass from the player character PC because the ball B is positioned at the center. Next, the area registration TBL 733 is referred to about areas AR included in each of prescribed retrieved ranges Fa1 and Fa5 corresponding to attacking directions, it is known that the parts shown with shading of the retrieved ranges Fa1 and Fa5 are spaces. Hereupon, the retrieved ranges Fa1 and Fa5 are prescribed ranges toward the attacking direction (competitor's position direction) on the basis of the positions of the non-player characters NPC1 and NPC5, and the ranges corresponding to "the forward direction" of the non-player characters NPC1 and NPC5. Consequently, both of the non-player characters NPC1 and NPC5 satisfy the condition of "space lies in attacking direction" (correspondingly to Step S108).

Next, as shown in FIG. 16B, the movement target point of each of the non-player characters NPC1 and NPC5 is determined. As to the non-player character NPC1, the areas AR included in the retrieved range Fa1 are referred to, and the area AR-1 having the highest space evaluation point is set as the movement target point. Similarly, as to the non-player character NPC5, the area AR-5 in the retrieved range Fa5 is set as the movement target point (correspondingly to Step S112).

Then, the movement evaluation point of each of the non-player characters NPC1 and NPC5 is calculated as follows. That is, the movement evaluation point of the non-player character NPC1 is 5 (=movement evaluation point "2"/2× movement peculiar weighting factor "5"), and the movement evaluation point of the non-player character NPC5 is 7.5 (=movement evaluation point "3"/2×movement peculiar weighting factor "5") (correspondingly to Step S114).

Accordingly, the movement "running into front space" with the movement target point of the area AR-5 is set to the non-player character NPC5 (correspondingly to Step S120). The movement of the non-player character NPC5 is controlled, for example, to run into the area AR-5, a space, at a full speed.

When the player see the action to send a pass to the non-player character NPC5, the player executes the tactics of running into a space in a game like in actual soccer.

[Hardware Configuration]

Figure 17:
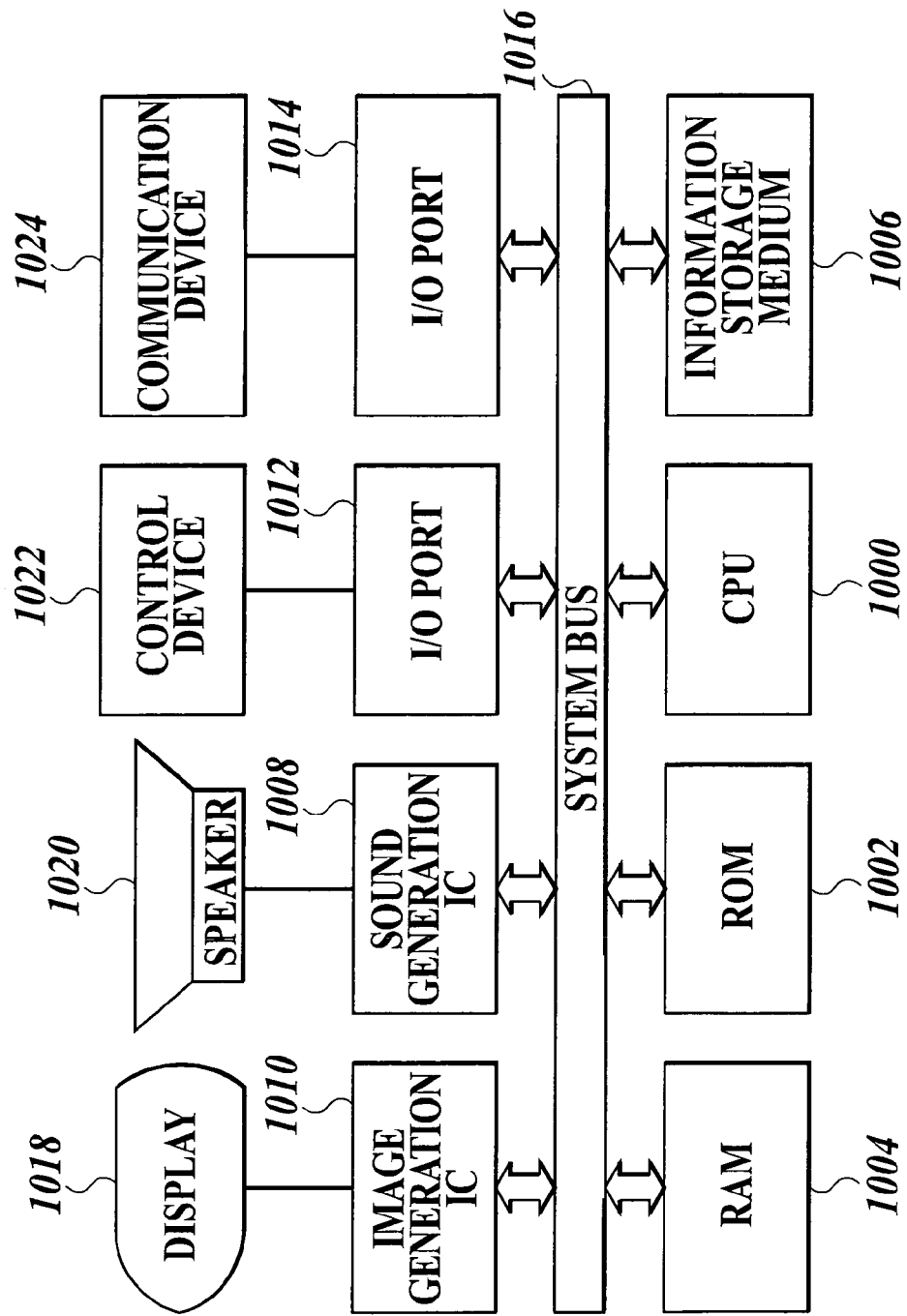
FIG. 17 is a view showing an example of a hardware configuration realizing the household game apparatus.

Next, a hardware construction which could implement the functions of the household game apparatus 1200 will be described. FIG. 17 is a diagram showing an example of the hardware construction according to the embodiment of the present invention. The household game apparatus 1200 comprises a CPU 1000, a ROM 1002, a RAM 1004, a data storage medium 1006, a sound generation IC 1008, an image generation IC 1010, and I/O ports 1012 and 1014. They are connected to each other via a system bus 1016 so as to input/output data.

The CPU 1000 corresponds to the processing unit 20 in FIG. 8, and performs total control of the household game apparatus 1200 and various data processes, according to a program stored in the data storage medium 1006, a system program stored in the ROM 1002, the operation input signals inputted through the control device 1022 or the like.

The ROM 1002, the RAM 1004 and the data storage medium 1006 correspond to the storage unit 70 in FIG. 8. The ROM 1002 corresponds to the IC memory implemented in the main unit 1210 in FIG. 1, and stores programs and data such as the system program or the like related to the control of the main unit 1210.

The RAM 1004 is a storage unit used as a work area of the CPU 1000. The RAM 1004 stores for example, given contents in the ROM 1002 or the data storage medium 1006, results computed by the CPU 1000 and the like.

The data storage medium 1006 corresponds to the CD-ROM 1212, the IC memory 1214 and the memory card 1216 in FIG. 1, and stores the game information 72 in FIG. 8. The functions of the data storage medium 1006 could be implemented by an IC memory card, a hard disc unit detachable from the main unit, MO or the like. Furthermore, The data storage medium 1006 stores data stored in the ROM 1002, and loads the data to use, as needed.

The sound generation IC 1008 is an integrated circuit designed to generate game sounds such as sound effects and BGM based on the data stored in the data storage medium 1006 or the ROM 1002. The generated game sounds are output from a speaker 1020. The speaker 1020 corresponds to the sound output unit 40 in FIG. 8 or the speaker 1222 in FIG. 1.

The image generation IC 1010 is an integrated circuit designed to generate pixel information for outputting images to a display 1018. The image generation IC 1010 corresponds to the image generation unit 24 in FIG. 8. The display 1018 corresponds to the image display unit 30 in FIG. 8 or the display 1220 in FIG. 1.

The I/O port 1012 connects to a control device 1022. The I/O port 1014 connects to a communication device 1024.

The control device 1022 corresponds to the operation input unit 10 in FIG. 8, or the game controllers 1202 in FIG. 1. The control device 1022 is designed to permit a player to input various operation data The communication device 1024 is designed to input/output various information to be used in the game unit to/from an external device. It connects to another game device in order to transmit/receive information required for the game program. It also transmits/receives the game program information via a communication line. The communication device 1024 corresponds to the communication unit 50 in FIG. 3 or the communication device 1218 in FIG. 1.

Software execution with the CPU 1000 or a general-purpose DSP may also be allowed for processes which could be executed by the sound generation IC 1008 or the image generation IC 1010.

The present invention applies not only to the household game apparatus 1200 shown in FIG. 1, also to various devices including an arcade game device, a mobile game device, a general-purpose computer such as a personal computer, a large-sized attraction device in which many players can participate, or the like.

Figure 18:
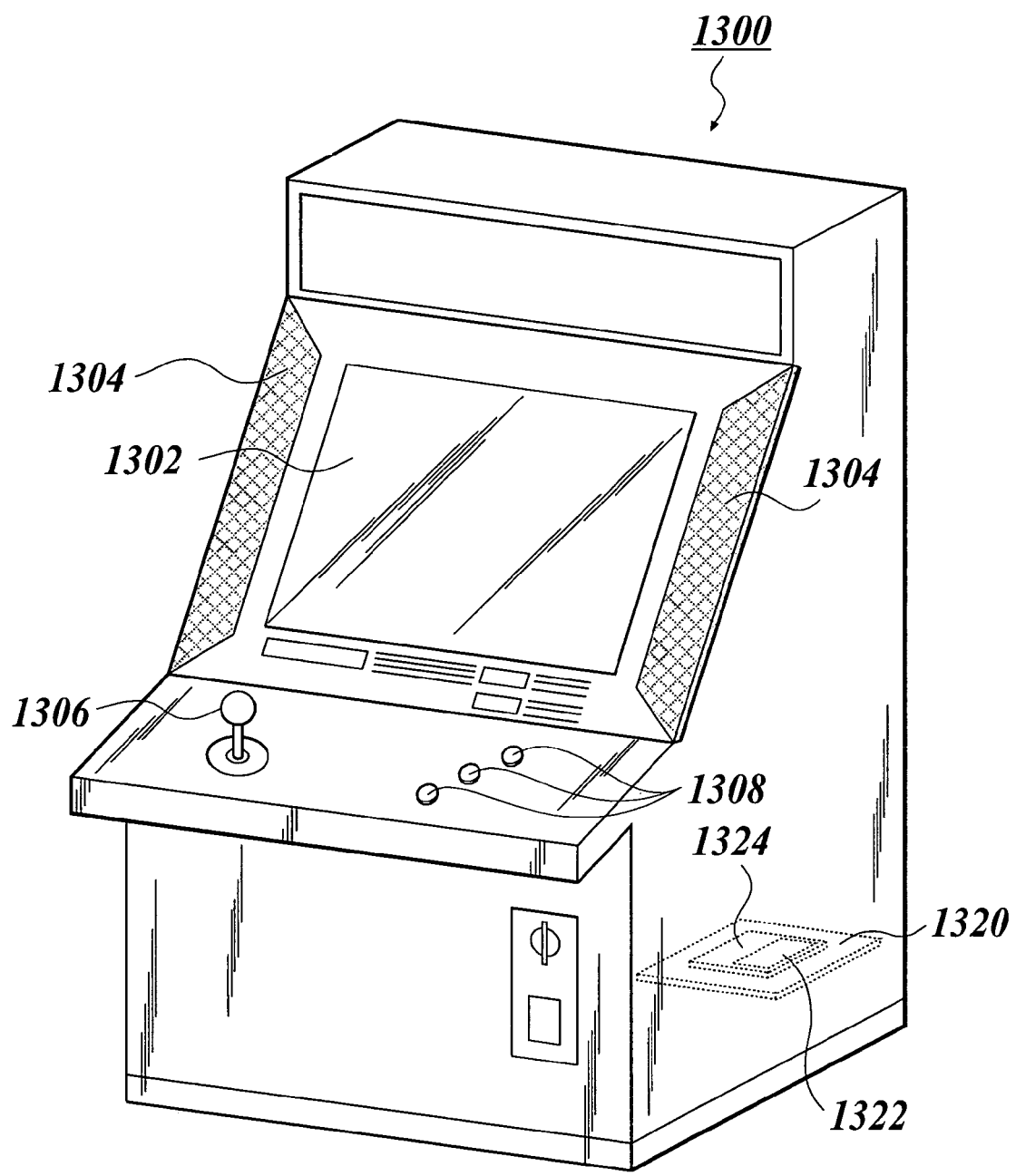
FIG. 18 is a view showing an example of an external appearance in the case where the present invention is applied to an arcade game apparatus.

FIG. 18 shows an example of the exterior of an arcade game apparatus 1300 to which the present invention is applied, for example. As shown in the drawing, an arcade game apparatus 1300 is provided with a display 1302 for displaying game pictures, a speaker 1304 for outputting sound effect and BGM in the game, a joystick 1306 for inputting vertical and horizontal operations, push buttons 1308, and a control unit 1320 for integrally controlling the arcade game apparatus 1300 by computer processing to execute a given game.

The control unit 1320 is equipped with a processing unit such as a CPU, and a ROM 1322 in which game programs and data are stored that are required to control the arcade game apparatus 1300 and to execute the game. The CPU mounted on the control unit 1320 reads from the ROM 1322 as appropriate and computes the programs and data to execute a variety of processes.

The player operates the joystick 1306 and push buttons 1308 while watching the game pictures displayed on the display 1302 to enjoy playing the game.

It should be understood that the application of the present invention is not limited to games to be executed on a stand-alone device, but the present invention may be applied to those called network games. Examples of the system configuration designed to implement a network game are as follows: (1) configuration having a home PC or home game system as a game terminal to be connected to a server via a wired/wireless communication line such as the Internet or a dedicated line network; (2) configuration connecting multiple game terminals to each other via a communication line without a server; (3) configuration connecting multiple game terminals via a communication line, one of which functions as a server; and (4) configuration physically linking multiple game terminals with each other to serve as a single system (for example, arcade game system).

Second Embodiment:

Next, FIGS. 19A-21 will be referred to while a second embodiment to which the present invention is applied is described. The present embodiment is basically realized by constituent elements similar to those of the first embodiment. The present embodiment differs from the first embodiment in that the present embodiment executes the judgments of spaces by the team to control the non-player characters NPC. Incidentally, the constituent elements similar to those of the first embodiment are denoted by the same reference signs, and their descriptions are omitted.

FIGS. 19A and 19B are views showing examples of area registration TBL's 735 of the present embodiment. The area registration TBL's 735 are ones in place of the area registration TBL 733 of the first embodiment. As shown in FIGS. 19A and 19B, as the area registration TBL's 735, an area registration TBL 735-1 storing the information concerning the power distribution of the player team, and an area registration TBL 735-2 storing the information concerning the power distribution of the COM team are prepared.

Each of the area registration TBL's 735-1 and 735-2 stores an area identification information 733a of the areas AR, the representative point coordinates 733b of representative points Q, the minimum arrival times Ts (735c) of each team, which times Ts have been judged by the power distribution calculation unit 222, and space evaluation points 735f set by the space evaluation unit 223 correspondingly to one another.

That is, by the reference to the area registration TBL's 735-1 and 735-2, the places where the athletes of the own side team exist or do not exist, and the places where the athletes of the COM team exist or do not exist in the pitch Fp can be known. The own side team means one to which the player character PC belong.

FIG. 20 is a view showing an example of movement setting information 736 in the present embodiment. The movement setting information 736 is the information in place of the movement setting information 734 in the first embodiment. As shown in the same drawing, each of the kinds of movements 736a correspondingly stores a circumstantial condition 736b storing the condition of the game situation under which the movement is selected, athlete selection conditions 736c storing conditions for the selection of the athlete who executes the movement, a movement target point selection condition 736d storing the condition of the position and/or the magnitude of the movement target point of the movement, a movement evaluation point 736e storing an index or a calculation formula of the index, which index indicates the degree of the priority of the movement action, and a reference TBL 736g instructing each of the kind of movement 736a on which of the area registration TBL's 735-1 and 735-2 should be referred to. In the present embodiment, the NPC movement setting unit 228 refers to one of the area registration TBL's 735 appointed by the reference TBL 736g at the time of the selection of the movement target point of the kind of movement and the calculation of the movement evaluation points.

Figure 21:
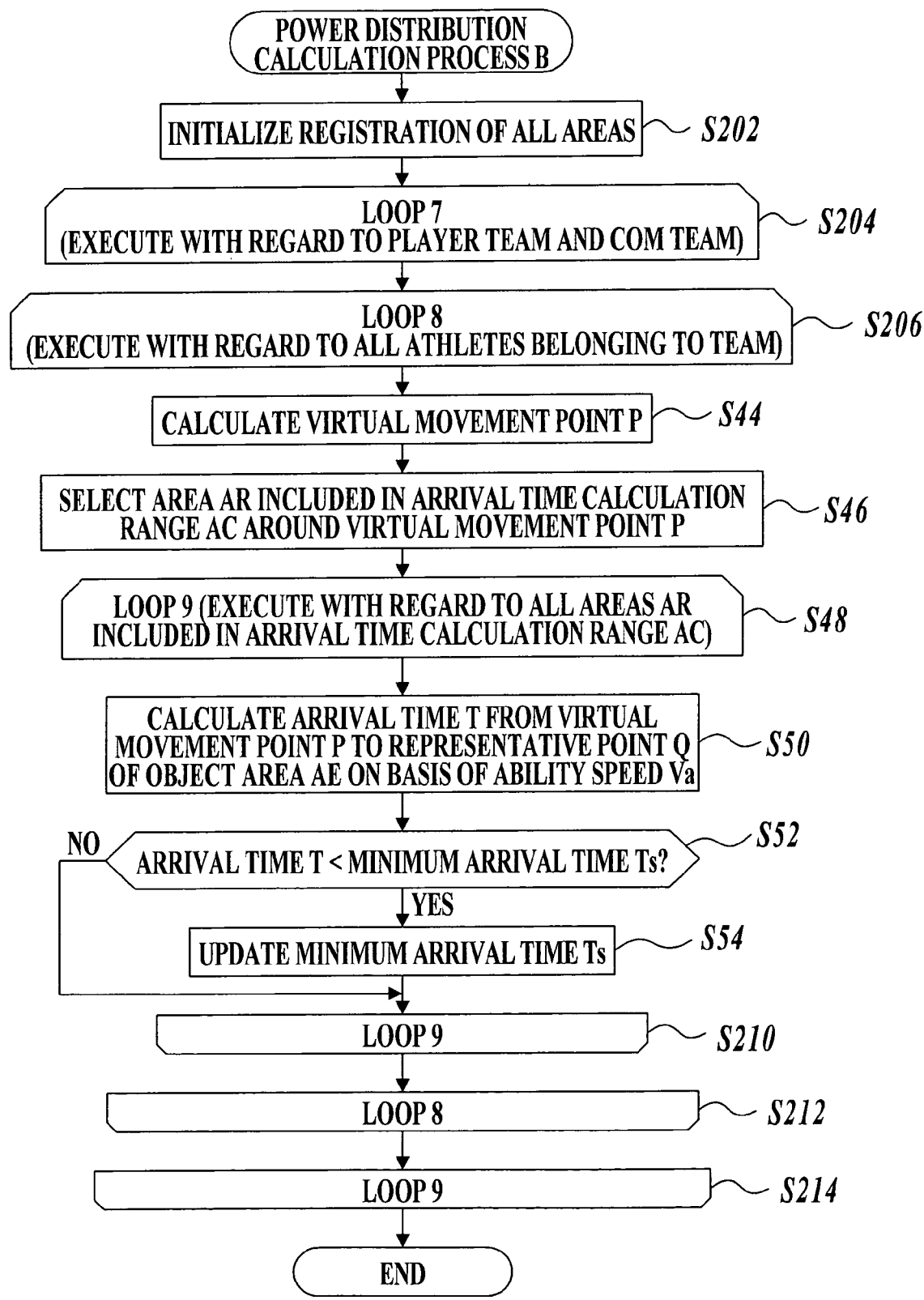
FIG. 21 is a flow chart for illustrating the flow of a power distribution calculation process B in the second embodiment.

FIG. 21 is a flow chart for illustrating the flow of a power distribution calculation process B in the present embodiment. The process to be described here is defined by the power distribution calculation program 722, and is executed by the power distribution calculation unit 222 in place of the power distribution calculation process of the first embodiment.

As shown in the same drawing, the power distribution calculation unit 222 first initializes the registers in all of the areas of the area registration TBL's 735-1 and 735-2 (Step S202). Next, a loop 7 is executed to each team to obtain the information concerning the power distribution of each team (Steps S204-S214).

In the loop 7, the power distribution calculation unit 222 first executes a loop 8 to all of the athletes belonging to each team (Steps S206-S212).

In the loop 8, the power distribution calculation unit 222 first obtains the virtual movement point P of the athlete of the processing object (Step S44), and selects the areas AR included in the arrival time calculation range AC around the virtual movement point P (Step S46). Then, the power distribution calculation unit 222 executes a loop 9 to each of the selected areas AR, and calculates the arrival times T of the athlete of the processing object to arrive at the areas AR to register the minimum arrival times Ts in the area registration TBL's 735 (Steps S48-S210).

When the power distribution calculation unit 222 has executed the loop 8 to all of the athletes of the respective teams and has executed the loop 7 to both of the player team and the COM team, the power distribution calculation process B in the present embodiment is ended.

The space evaluation process and the NPC movement setting process are executed by the space evaluation unit 223 and the NPC movement setting unit 228, respectively, similarly to the first embodiment.

According to the present embodiment, a power distribution situation is obtained to each team. Thereby, the power distribution more suitable to the object of the kind of movement can be referred to. In particular, the power distribution situation of the partner team of the player character PC, namely the own side team, is effective for the reference at the time of the execution of the movement control of the non-player characters NPC when the COM team keeps the ball B (in case of the defensive side).

[Descriptions of Modification Examples]

In the above, the first and the second embodiments of the present invention have been described. However, the application of the present invention is not limited to those embodiments, but the addition, the deletion and the alteration of the constituent elements may be suitably performed without departing from the spirit and the sphere of the present invention.

For example, the kinds of the applicable games are not limited to a soccer game and a strategic simulation, but the games can be similarly applicable as long as the games is ones for entering a ball into a goal area while competing among a plurality of teams composed of a plurality of athlete characters who can move in a field and include a player character acting in response to the operation inputs of a player and non-player characters. Sport games such as hockey, basketball and Rugby are suitable.

Figure 22:
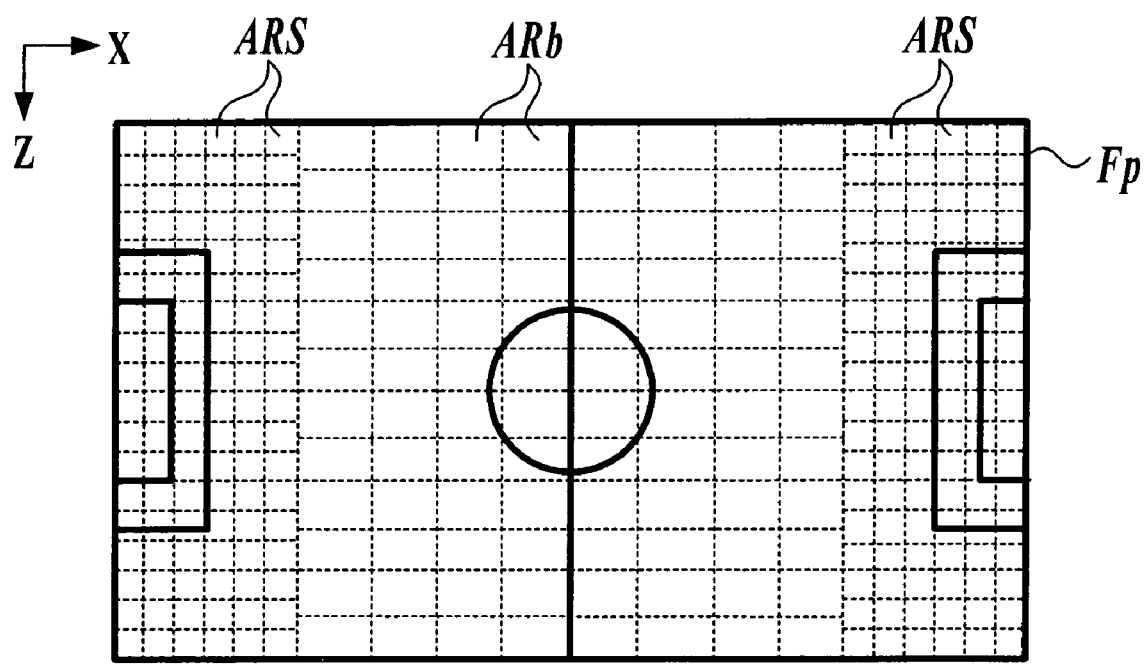
FIG. 22 is a view showing a modification example of the setting of areas AR.

Moreover, for example, the magnitudes and the arrangement of the areas AR are uniformly set in the pitch Fp. However, the magnitudes and the arrangement are not limited to such a manner. For example, as shown in FIG. 22, the magnitudes and the arrangement may be configured to set minute areas ARs before the goals, and to set large areas ARb each having a larger area than that of each of the minute areas ARs in the vicinity of the center of the pitch Fp. In this case, the power distributions around the goals where characters are easily congested can be calculated more minutely and can be displayed. Moreover, on the other hand, the throughput is decreased at the parts of the areas Arb, and the speed of the process on the whole can be achieved to be high.

Moreover, the shape of an area AR is not limited to a quadrilateral, but the shape may be the other shapes such as a triangle, a hexagon, an ellipse and a sector form. In such a case, a geographical shape feature can be precisely expressed in a small number of areas.

Moreover, the ability speed $732g$ is described to be a fixed value. However, for example, the ability speed $732g$ may be configured to decrease substantially according to the accumulation hours of entries to games by the storing of the game entry time accumulation hours of each athlete from each start of a game into the storage unit 70 with the game operating unit 22 and by the calculation of the arrival times T by the values produced by the multiplication of the ability speeds Va by coefficients in proportion to the game entry time accumulation hours at Step S50 (see FIG. 13). In this case, the tiredness of the athletes can be reflected.

Moreover, the movement setting information 734 may be set at every team. In this case, the setting of the condition of the movement setting information 734 produces differences in minute parts of tactics to make it possible to show the individuality of a team. Moreover, a change of the weighting factor in the calculation of the movement evaluation point $734e$ enables to change the kind of preferential movement at every team. Thereby, the change of the weighting factor makes it possible to produce differences in the operation side of the tactics.

According to the present invention, the areas concerning the power of a character group are recognized on the arrival time of each character up to a plurality of sample points set in a game space, and the movements of characters can be controlled on the positions and/or magnitudes of the recognized areas.

Consequently, the control such as the movements of characters to areas on the positional relations from the characters to the areas, the detour of the areas, or the selection of larger dominant areas as movement target points makes it possible to make the characters act according to the geographical power distributions in a game space.

The entire disclosure of Japanese Patent Application No. Tokugan 2003-122695 filed on Apr. 25, 2003 including specification, claims, drawings and summary are incorporated herein by reference in its entirety.

What is claimed is:

1. A game performing method for executing a game by controlling movements of characters constituting a character group in a game space and by generating an image of the game space,
    wherein the character group includes a plurality of character groups,
    the method comprising:
    setting a plurality of sample points in the game space;
    calculating positions of the characters after a prescribed time when the characters keep a present moving situation;
    calculating a time for each character to arrive at the set plurality of sample points from the calculated positions as starting points;
    drawing out, from the plurality of sample points, sample points to which an arrival time is more than or equal to a reference time for determining a space area for any character in any of the character groups, based on the calculated arrival time, the space area being an area not belonging to a power of any of the character groups in the game space;
    recognizing the space area in the game space, based on the drawn out sample points;
    controlling the movements of the characters based on the space area and/or magnitudes of the space area in the game space; and
    updating the image of the game space.

2. The method as claimed in claim 1, further comprising:
    selecting a character within a character group and controlling the movements of the character based on the relative positional relationship between the character and the space area and/or the magnitudes of the space area.

3. The method as claimed in claim 2,
    wherein the game is a competition-type game, in which an attacking direction of the character group is previously determined, and
    the character selected to be controlled is selected in consideration of the attacking direction of the character group.

4. The method as claimed in claim 2,
    wherein the game is a ball game, and
    the character selected to be controlled is selected in consideration of a position of a ball in the game space.

5. The method as claimed in claim 1, further comprising:
    setting movement target positions within the recognized space areas,
    wherein controlling the movements of the characters includes moving the characters to the set movement target positions.

6. A game performing method for executing a game by controlling movements of characters constituting a character group in a game space and by generating an image of the game space,
    wherein the character group includes a plurality of character groups,
    the method comprising:
    setting a plurality of sample points in the game space;
    calculating positions of the characters after a prescribed time when the characters keep a present moving situation;
    calculating a time for each character to arrive at the set plurality of sample points from the calculated positions as starting points;
    recognizing an area pertaining to power of each of the character groups, wherein the power of each of the character groups is based on an arrival time of each of the characters in the character group to each character's sample point, from among the calculated arrival time;
    recognizing, as a space area, an area not belonging to the power of any of the character groups in the game space, based on the recognized area pertaining to the power;
    controlling the movements of the characters based on a position of the space area and/or a magnitude of the space area in the game space; and
    updating the image of the game space.

7. The method as claimed in claim 6, further comprising:
    setting movement target positions within the recognized space areas,
    wherein controlling the movements of the characters includes moving the characters to the set movement target positions.

8. The method as claimed in claim 7, wherein movement target positions are set from recognized power areas to recognized space areas.

9. The method as claimed in claim 6,
wherein the character groups include a first character group and a second character group,
the power of each of the character groups is based on the calculated times of each group to arrive at their respective sample points, and
controlling the movements of the characters constituting the first character group based on the characters' positions and/or the magnitudes of power in the recognized areas wherein the recognized areas pertain to the power of the second character group in the game space; and
controlling the movements of the characters constituting the second character group based on the characters' positions and/or the magnitudes of power in the recognized areas wherein the recognized areas pertain to the power of the first character group in the game space.

10. The method as claimed in claim 6,
wherein the character groups include a first character group and a second character group,
the power of each of the character groups is based on the calculated times of each group to arrive at their respective sample points,
the controlling of the movements of the characters constitutes the first character group based on the characters' positions and/or the magnitudes of power in the recognized areas wherein the recognized areas pertain to the power of the first character group in the game space, and
controlling the movements of the characters constituting the second character group based on the characters' positions and/or the magnitudes of power in the recognized areas wherein the recognized areas pertain to the power of the second character group in the game space.

11. The method as claimed in claim 6, further comprising:
selecting a character within a character group and controlling the movements of the character based on the relative positional relationship between the character and the space area and/or the magnitudes of the space area.

12. The method as claimed in claim 11,
wherein the game is a competition-type game, in which an attacking direction of the character group is previously determined, and
the character selected to be controlled is selected in consideration of the attacking direction of the character group.

13. The method as claimed in claim 11,
wherein the game is a ball game, and
the character selected to be controlled is selected in consideration of the position of a ball in the game space.

14. The method as claimed in claim 6,
wherein the powers of the character groups are recognized when a predominance degree of each sample point is calculated so as to make the predominance degree higher as the arrival time of the character is shorter.

15. A game apparatus for executing a game by controlling movements of characters constituting a character group in a game space, and by generating an image of the game space,
wherein the character group includes a plurality of character groups,
the game apparatus comprising:
a point setting section for setting a plurality of sample points in the game space;
an inertia calculation section for calculating positions of the characters after a prescribed time when the characters keep a present moving situation;
an arrival time calculation section for calculating the times that each character takes to reach the set plurality of sample points from the calculated positions as starting points;
a drawing section for drawing out, from the plurality of sample points, sample points to which an arrival time is more than or equal to a reference time for determining a space area for any character in any of the character groups, based on the calculated arrival time, the space area being an area not belonging to the power of any of the character groups in the game space;
a space area recognition section for recognizing the space area in the game space, based on the drawn out sample points;
a movement control section for controlling the movements of the characters based on a position of the space area and/or a magnitude of the space area in the game space; and
a generated image display section for displaying the generated the display image.

16. A computer-executable storage medium that contains a computer executable program that causes an operating device to receive a data signal embodied in a carrier wave, the data signal causing the operating device to perform a method comprising:
setting a plurality of sample points in a game space;
calculating positions of characters after a prescribed time when the characters keep a present moving situation;
calculating a time for each character to arrive at the set plurality of sample points from the calculated positions as starting points;
drawing out, from the plurality of sample points, sample points to which an arrival time is more than or equal to a reference time for determining a space area for any character in any of the character groups, based on the calculated arrival time, the space area being an area not belonging to a power of any of the character groups in the game space;
recognizing the space area in the game space, based on the drawn out sample points;
controlling movements of the characters based on the space area and/or magnitudes of the space area in the game space; and
updating the image of the game space.

17. A computer-readable storage medium that includes a program stored therein, wherein when loaded onto an operating device, the program makes the operating device execute a method comprising:
setting a plurality of sample points in a game space;
calculating positions of characters after a prescribed time when the characters keep a present moving situation;
calculating a time for each character to arrive at the set plurality of sample points from the calculated positions as starting points;
drawing out, from the plurality of sample points, sample points to which an arrival time is more than or equal to a reference time for determining a space area for any character in any of the character groups, based on the calculated arrival time, the space area being an area not belonging to a power of any of the character groups in the game space;
recognizing the space area in the game space, based on the drawn out sample points;
controlling movements of the characters based on the space area and/or magnitudes of the space area in the game space; and
updating the image of the game space.

18. A game apparatus for executing a game by controlling movements of characters constituting a character group in a game space and by generating an image of the game space, wherein the character group includes a plurality of character groups, the apparatus comprising:

- a point setting section for setting a plurality of sample points in the game space;
- an inertia calculation section for calculating positions of the characters after a prescribed time when the characters keep a present moving situation;
- an arrival time calculation section for calculating the time for each character to arrive at the set plurality of sample points from the calculated positions as starting points;
- an area recognition section for recognizing an area pertaining to power of each of the character groups, wherein the power of each of the character groups is based on an arrival time of each of the characters in the character group to each character's sample point, from among the calculated arrival time;
- a space area recognition section for recognizing, as a space area, an area not belonging to the power of any of the character groups in the game space, based on the recognized area pertaining to the power;
- a movement control section for controlling the movements of the characters based on a position of the space area and/or a magnitude of the space area in the game space; and
- a generated image display section for displaying the generated display image.

19. A computer-executable storage medium that contains a computer executable program that causes an operating device to receive a data signal embodied in a carrier wave, the data signal causing the operating device to perform a method comprising:

- setting a plurality of sample points in a game space;
- calculating positions of characters after a prescribed time when the characters keep a present moving situation;
- calculating a time for each character to arrive at the set plurality of sample points from the calculated positions as starting points;
- recognizing an area pertaining to power of each of the character groups, wherein the power of each of the character groups is based on an arrival time of each of the characters in the character group to each character's sample point, from among the calculated arrival time;
- recognizing, as a space area, an area not belonging to the power of any of the character groups in the game space, based on the recognized area pertaining to the power;
- controlling the movements of the characters based on a position of the space area and/or a magnitude of the space area in the game space; and
- updating the image of the game space.

20. A computer-executable storage medium that stores a program, wherein when the program is loaded onto an operating device, the program making the operating device execute a method comprising:

- setting a plurality of sample points in a game space;
- calculating positions of characters after a prescribed time when the characters keep a present moving situation;
- calculating a time for each character to arrive at the set plurality of sample points from the calculated positions as starting points;
- recognizing an area pertaining to power of each of the character groups, wherein the power of each of the character groups is based on an arrival time of each of the characters in the character group to each character's sample point, from among the calculated arrival time;
- recognizing, as a space area, an area not belonging to the power of any of the character groups in the game space, based on the recognized area pertaining to the power;
- controlling the movements of the characters based on a position of the space area and/or a magnitude of the space area in the game space; and
- updating the image of the game space.

* * * * *